US009690176B2

(12) United States Patent
Takehana

(10) Patent No.: US 9,690,176 B2
(45) Date of Patent: Jun. 27, 2017

(54) PROJECTION OPTICAL APPARATUS AND PROJECTOR

(71) Applicant: SEIKO EPSON CORPORATION, Tokyo (JP)

(72) Inventor: Naoto Takehana, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 15/003,274

(22) Filed: Jan. 21, 2016

(65) Prior Publication Data

US 2016/0216598 A1   Jul. 28, 2016

(30) Foreign Application Priority Data

Jan. 27, 2015 (JP) ................................. 2015-013029
Nov. 6, 2015 (JP) ................................. 2015-218093

(51) Int. Cl.

| G02B 7/02 | (2006.01) |
|---|---|
| G02B 13/16 | (2006.01) |
| G03B 21/28 | (2006.01) |
| G03B 21/14 | (2006.01) |

(52) U.S. Cl.
CPC ............ *G03B 21/147* (2013.01); *G02B 13/16* (2013.01); *G03B 21/142* (2013.01); *G03B 21/28* (2013.01); *G02B 7/023* (2013.01)

(58) Field of Classification Search
CPC ...... G03B 13/16; G03B 21/147; G03B 21/28; G03B 21/142; G02B 17/08; G02B 7/023

USPC ....... 359/649, 650, 651, 704, 808, 819, 811; 353/77, 78, 98, 99, 119
See application file for complete search history.

(56) References Cited

U.S. PATENT DOCUMENTS

2011/0292355 A1* 12/2011 Amano .................. G02B 7/021
353/98
2016/0170228 A1* 6/2016 Yamagami ............. G02B 7/023
359/557

FOREIGN PATENT DOCUMENTS

JP          2011-085922 A        4/2011

* cited by examiner

*Primary Examiner* — William C Dowling
*Assistant Examiner* — Ryan Howard
(74) *Attorney, Agent, or Firm* — Oliff PLC

(57) ABSTRACT

In a projection optical apparatus, a refractive system includes a plurality of lens groups, one of which includes a first lens located in a position closest to a reflective system and a first lens frame having an accommodation section that accommodates the first lens. The first lens has a lens cutoff section, and the accommodation section has a wall section that is located outside the lens cutoff section and a first opening section that exposes a side surface of the first lens that is opposite the lens cutoff section. The wall section is provided with an open section that exposes the lens cutoff section. A guide barrel is so formed as to expose the first opening section and the open section. A projection optical apparatus enclosure has a second opening section that exposes the first opening section and is configured to be capable of exposing the open section.

12 Claims, 11 Drawing Sheets

PROJECTION OPTICAL APPARATUS AND PROJECTOR

BACKGROUND

1. Technical Field

The present invention relates to a projection optical apparatus and a projector.

2. Related Art

There is a known projector of related art in which a light modulator modulates light emitted from a light source (emitted light) in accordance with image information and a projection optical apparatus enlarges and projects the modulated light. Some projectors project a wide-field-angle image on a screen or any other projection surface over a short distance. In such a projector, a short-focal-length projection optical apparatus is used as a projection optical apparatus capable of wide-field-angle projection over a short distance. In recent years, a projection system for achieving a wide filed angle over a short distance is formed not only of a refractive system but also of a refractive/reflective compound system.

JP-A-2011-85922 discloses an optical system using a fixed lens section, a movable lens section, and a concave mirror, specifically, a projection/image formation system having a configuration in which an oblique light flux in oblique projection is configured to be inclined to the optical axis by a small angle for effective avoidance of a situation in which a lens barrel truncates an image forming light flux.

Since a projection system for wide-filed-angle projection over a short distance (short-distance projection) has a very short distance from a projection optical apparatus to a screen, variation in aberrations resulting from focusing is greater than the variation in a typical projection optical apparatus. Further, such a projection system has a configuration in which a plurality of spherical lenses that are highly sensitive and aspherical lenses are used, and variance in the position where each of the lenses is disposed greatly affects the variation in aberrations. As a result, an image projected on the screen tends to suffer from field curvature, a decrease in contrast due to the variation in aberrations, and other disadvantageous effects, undesirably resulting in a large decrease in image quality. It is therefore necessary in the assembly of lens groups to minimize variance in the position where each of the lenses is disposed, perform post-assembly optical adjustment, and take other measures.

In a projection optical apparatus using a refractive system and a reflective system, to adjust the position of a lens after the assembly, for example, an image is projected via a reflection mirror, and the position of a lens in the refractive system is adjusted while the projected image is viewed in some cases.

In this case, as a method for the adjustment, it is conceivable to use a master projection optical apparatus (in this stage, an apparatus that includes a reflection mirror but includes no projection optical unit that forms the refractive system and is used only as a reference) and place a target projection optical unit under positional adjustment in the master projection optical apparatus to perform the positional adjustment. In this case, after the adjustment, it is necessary to remove the target projection optical unit from the master projection optical apparatus and reassemble the removed projection optical unit into a projection optical apparatus to be actually used (in this stage, an apparatus that includes a reflection mirror but excludes only the projection optical unit that forms a refractive system). However, since the master projection optical apparatus and the actual projection optical apparatus are different apparatus, and variance in assembly may undesirably produce aberrations when the target projection optical unit is reassembled into an actual projection optical apparatus even if an aberration-free state has been achieved by using the master projection optical apparatus.

In contrast, as another method for the adjustment, it is conceivable to use no master projection optical apparatus but incorporate a target projection optical unit under positional adjustment into a projection optical apparatus to be actually used as a product and adjust the position of the projection optical unit incorporated in the projection optical apparatus. In this case, the target projection optical unit after the adjustment is not required to be removed, whereby an aberration-free state obtained by the adjustment can be retained.

To actually perform the positional adjustment, the position of a target projection optical unit inside a projection optical apparatus is adjusted by using an adjustment tool from the outside of the projection optical apparatus in both adjustment methods described above. In this case, when no master projection optical apparatus is used, reflected projection light is blocked in some cases not only by the adjustment tool but also a lens that forms the refractive system, a holding frame that holds a lens, and other components. When a master projection optical apparatus is used, projection light is reflected at an adjusted angle of reflection and the reflected projection light is therefore not blocked.

Further, a projection optical apparatus configured, assuming that the positional adjustment is performed by using a projection optical apparatus to be actually used, in such a way that an adjustment tool or any other component does not block projection light causes problems, such as difficulty in performing short-distance projection and an increase in the size of the projection optical apparatus.

It is therefore desired, in a case where a reflective system is used, to provide a projection optical apparatus that allows adjustment of the position of a lens without reflected light blocked and a projector including the projection optical apparatus.

SUMMARY

An advantage of some aspects of the invention is to solve at least a part of the problems described above, and the invention can be implemented as the following forms or application examples.

APPLICATION EXAMPLE 1

A projection optical apparatus according to this application example includes a first optical system including a plurality of lens groups arranged along an optical axis, a second optical system including a reflection mirror and reflects light having exited out of the first optical system, and a projection optical apparatus enclosure that accommodates the first optical system and the second optical system. The first optical system includes a first lens, among the plurality of lens groups, located in a position closest to the second optical system, a first lens frame having an accommodation section that accommodates the first lens, and a guide barrel that accommodates the first lens frame. The first lens has a lens cutoff section that is a region where part of the first lens is cut off and that is located on the side where the light reflected off the reflection mirror passes. The accommodation section has a wall section that is located outside the lens cutoff section and a first opening section that exposes a first side surface that is a side surface of the first lens and is opposite the lens cutoff section. The wall section is provided with an open section that exposes the lens cutoff section. The guide barrel is so formed as to expose the first opening section and the open section. The projection optical apparatus enclosure has a second opening section that exposes the first opening section and is configured to be capable of exposing the open section.

According to the projection optical apparatus described above, the first optical system includes a first lens located in a position closest to the second optical system and a first lens frame that accommodates the first lens. In a state in which the first optical system and the second optical system are accommodated in the projection optical apparatus enclosure, the open section exposes the lens cutoff section of the first lens, and the first opening section exposes the first side surface that is a side surface of the first lens and is opposite the lens cutoff section. The lens cutoff section and the wall section of the first lens frame are formed on the side where the light reflected off the reflection mirror passes. The configuration described above allows not only short-distance projection but also use of a probe or any other adjustment tool to move the first lens along a first direction oriented from the lens cutoff section toward the first side surface, that is, adjust the position of the first lens with respect to the optical axis of the first lens without blockage of projection light reflected off the reflection mirror.

Therefore, since the positional adjustment can be performed by use of no master projection optical apparatus but by use of the projection optical apparatus, which is a product, while a projected image is visually recognized, whereby suppressed amounts of aberrations achieved at the time of the adjustment can be directly and reliably maintained.

APPLICATION EXAMPLE 2

It is preferable that the projection optical apparatus according to the application example described above further includes a pressing section that has elasticity and presses the lens cutoff section exposed through the open section toward the first opening section.

According to the projection optical apparatus described above, the first lens can be held between an adjustment tool inserted through the first opening section and the pressing section, whereby moving the adjustment tool allows the adjustment of the position of the first lens. Since no adjustment tool is therefore required to be inserted from the side where the lens cutoff section is present, blockage of the projection light reflected off the reflection mirror can be further suppressed.

APPLICATION EXAMPLE 3

In the projection optical apparatus according to the application example described above, it is preferable that the first lens has a pair of second side surfaces located along a second direction that intersects a first direction oriented from the lens cutoff section toward the first side surface, that the accommodation section has a pair of third opening sections that expose the pair of second side surfaces, that the guide barrel is so formed as to expose the pair of third opening sections, and that the projection optical apparatus enclosure is so configured as to be capable of exposing the pair of third opening sections.

According to the projection optical apparatus described above, in the state in which the first optical system and the second optical system are accommodated in the projection optical apparatus enclosure, the pair of second side surfaces of the first lens as well as the lens cutoff section and the first opening section are exposed. The position of the first lens can therefore be adjusted in the first and second directions.

APPLICATION EXAMPLE 4

In the projection optical apparatus according to the application example described above, it is preferable that each of the first opening section, the second opening section, and the pair of third opening sections is formed of two holes, two cutouts, or one hole and one cutout.

According to the projection optical apparatus described above, two probes are allowed to be inserted in correspondence with the two holes, the two cutouts, or the one hole and the one cutout and the come into contact with the side surface of the lens provided as one opening, whereby the lens can be more stably held. The configuration described above can provide its advantageous effect particularly when the position of a large or heavy lens is adjusted.

APPLICATION EXAMPLE 5

In the projection optical apparatus according to the application example described above, it is preferable that the accommodation section has a first fixing opening section that exposes a side surface of the first lens for fixation of the first lens, that the guide barrel is so formed as to expose the first fixing opening section, and that the projection optical apparatus enclosure has a second fixing opening section that exposes the first fixing opening section.

According to the projection optical apparatus described above, a dispenser or any other tool filled with an adhesive can be inserted into the second fixing opening section, and the adhesive can be injected onto the exposed side surface of the first lens via the first fixing opening section. As a result, the adhesive or any other material is injected into the gap between the side surface of the lens and the accommodation section, whereby the first lens can be reliably fixed to the accommodation section.

APPLICATION EXAMPLE 6

In the projection optical apparatus according to the application example described above, it is preferable that the plurality of lens groups include a lens group for focus adjustment.

According to the projection optical apparatus described above, variation in aberrations due to focus adjustment can be suppressed to a small value when short-distance projection is performed.

APPLICATION EXAMPLE 7

A projector according to this application example includes a light source apparatus that outputs light, a light modulator that modulates the light in accordance with image information, and the projection optical apparatus that is described in any of the applications examples and projects the light modulated by the light modulator.

According to the projector described above, since it includes the projection optical apparatus that allows suppressed amounts of aberrations achieved at the time of the adjustment to be maintained, variation in aberrations can be efficiently suppressed, whereby the quality of a projected image can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment will be described below with reference to the drawings.

Embodiment

Form in which Projector 1 is Used and Operation of Projector 1

Figure 1:
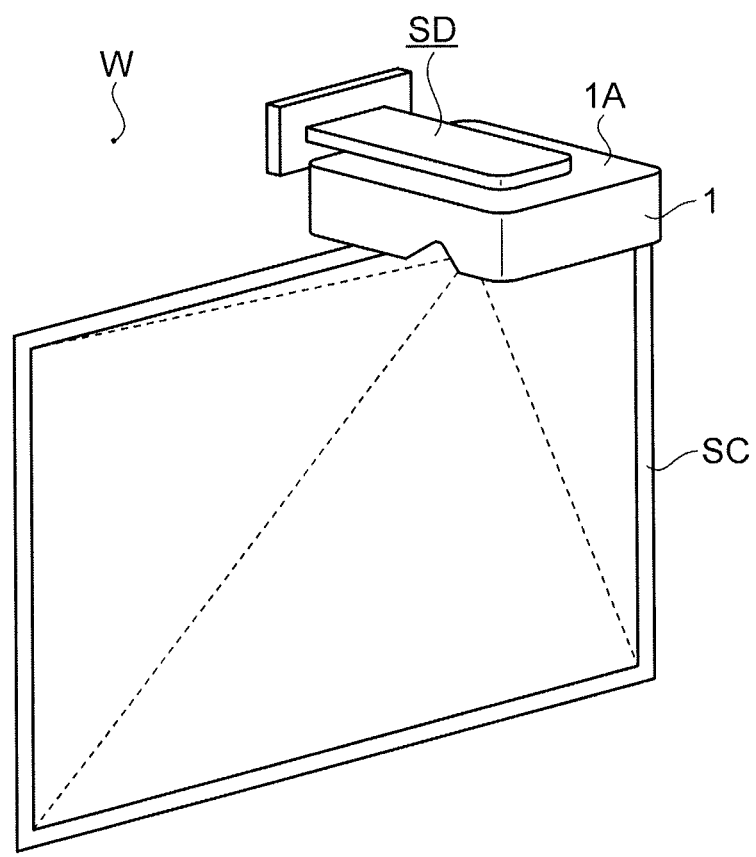
FIG. 1 is a perspective view showing the form in which a projector according to an embodiment of the invention is used.

FIG. 1 is a perspective view showing the form in which a projector 1 according to the present embodiment is used. The projector 1 is provided with a projection optical apparatus 5 according to the present embodiment.

The projector 1 according to the present embodiment is so installed as to be supported by a support apparatus SD, which is installed on a wall surface W, in such a way that a bottom surface 1A faces upward, as shown in FIG. 1. A screen SC as a projection surface is installed on a lower portion of the wall surface W, on which the projector 1 is installed, and in a position close to the projector 1.

In the projector 1, liquid crystal panels 351 (see FIG. 2) as light modulators modulate light outputted from a light source apparatus 31 (see FIG. 2) in accordance with image information, and the projection optical apparatus 5 (see FIG. 2) enlarges and projects the modulated light as image light. The projector 1 projects the image light (projection light) reflected off a reflection mirror 71 (see FIG. 2 and the following figures) in the projection optical apparatus 5 from the side opposite the bottom surface 1A on the screen SC. The projector 1 according to the present embodiment is configured as what is called a short-focal-length projector, which projects a large image (wide-field-angle image) on the screen SC over a short distance.

Configuration and Operation of Optical Unit 3 of Projector 1

Figure 2:
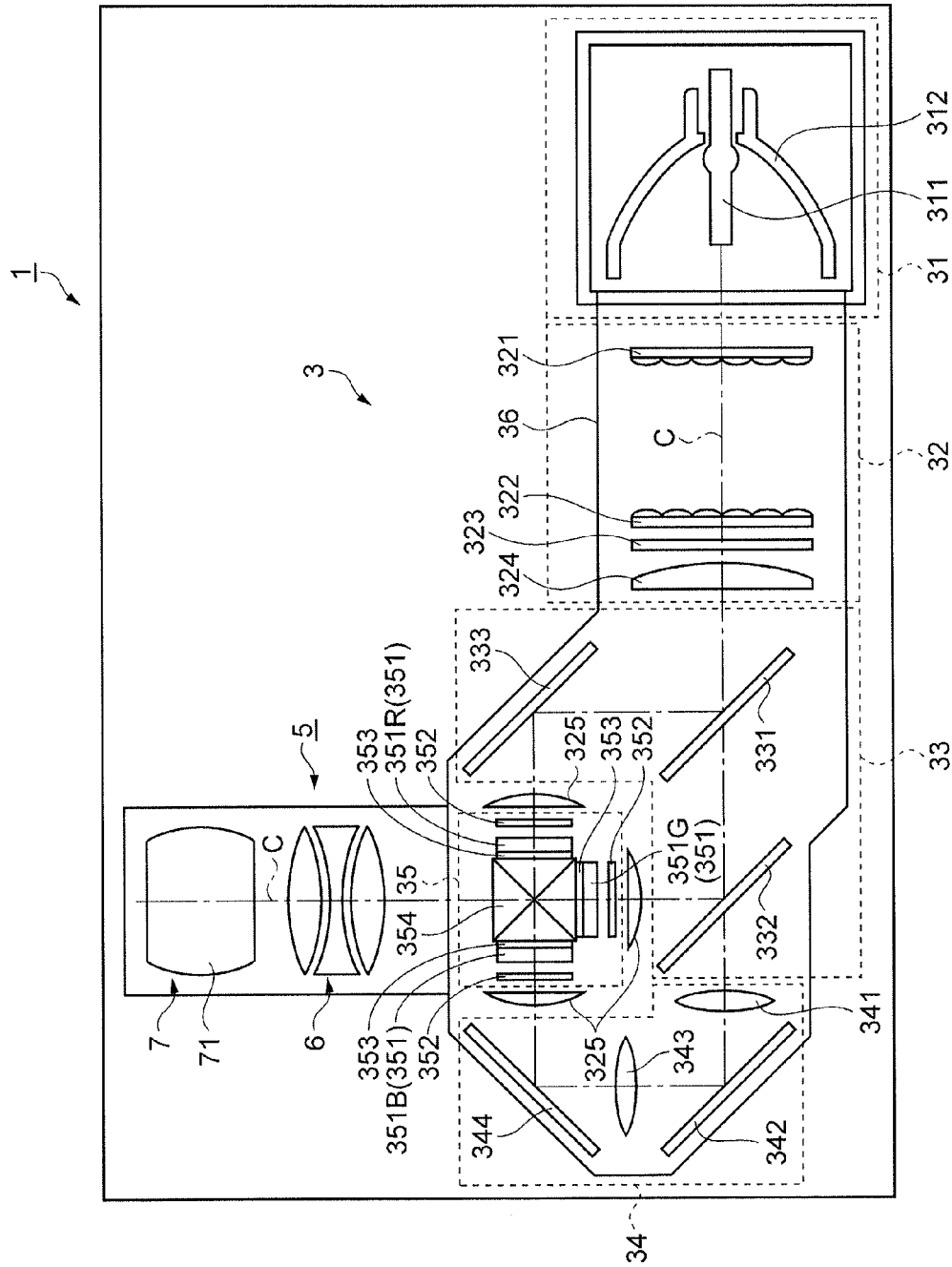
FIG. 2 diagrammatically shows an optical unit of the projector.

FIG. 2 diagrammatically shows an optical unit 3 of the projector 1. The optical unit 3 operates under the control of a controller (not shown) to form image light in accordance with image information. The optical unit 3 includes the light source apparatus 31, which includes a light source lamp 311 and a reflector 312, and an illumination optical apparatus 32, which includes lens arrays 321 and 322, a polarization conversion element 323, a superimposing lens 324, and parallelizing lenses 325, as shown in FIG. 2. The optical unit 3 further includes a color separation optical apparatus 33, which includes dichroic mirrors 331 and 332 and a reflection mirror 333, and a relay optical apparatus 34, which includes a light-incident-side lens 341, a relay lens 343, and reflection mirrors 342 and 344.

The optical unit 3 still further includes an electro-optical apparatus 35, which includes three liquid crystal panels 351 (reference character 351R denotes a liquid crystal panel for red light (R light), reference character 351G denotes a liquid crystal panel for green light (G light), and reference character 351B denotes a liquid crystal panel for blue light (B light)), three light-incident-side polarizers 352, three light-exiting-side polarizers 353, and a cross dichroic prism 354 as a light combining optical apparatus. The optical unit 3 still further includes the projection optical apparatus 5 and an optical part enclosure 36, which accommodates the optical apparatus 31 to 35.

In the optical unit 3 having the configuration described above, the color separation optical apparatus 33 separates the light having exited out of the light source apparatus 31 and passed through the illumination optical apparatus 32 into three color light fluxes, R light, G light, and B light. The separated color light fluxes are modulated by the respective liquid crystal panels 351 in accordance with image information and form modulated light fluxes on a color basis. The color modulated light fluxes are incident on the cross dichroic prism 354, which combines the light fluxes with one another into image light, which is enlarged and projected by the projection optical apparatus 5 on the screen SC (FIG. 1) or any other surface. Each of the optical apparatus 31 to 35 described above is used as an optical system of a variety of typical projectors and will not therefore specifically described.

Summary of Projection Optical Apparatus 5

Figure 3:
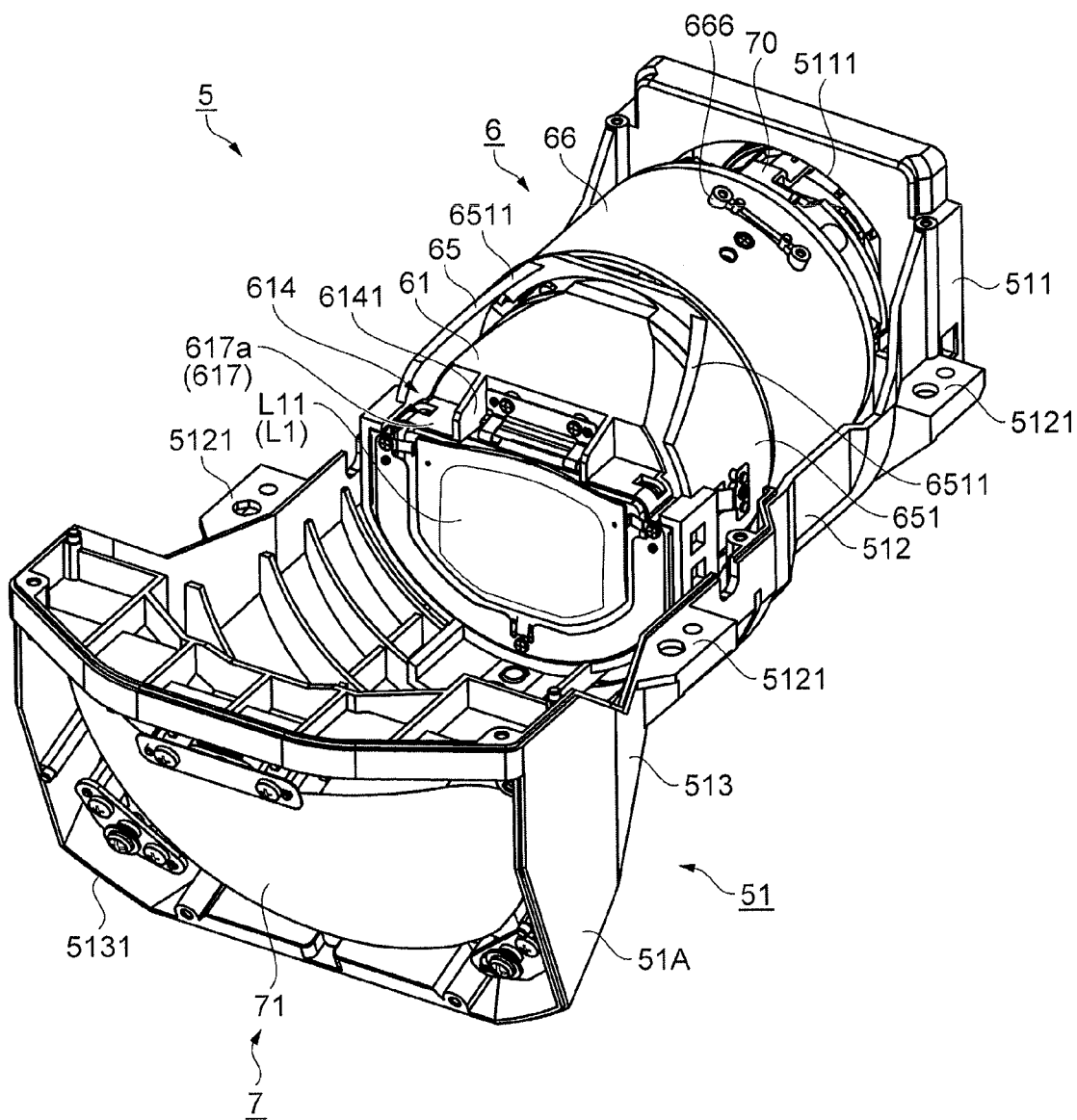
FIG. 3 is a perspective view of a projection optical apparatus.
Figure 4:
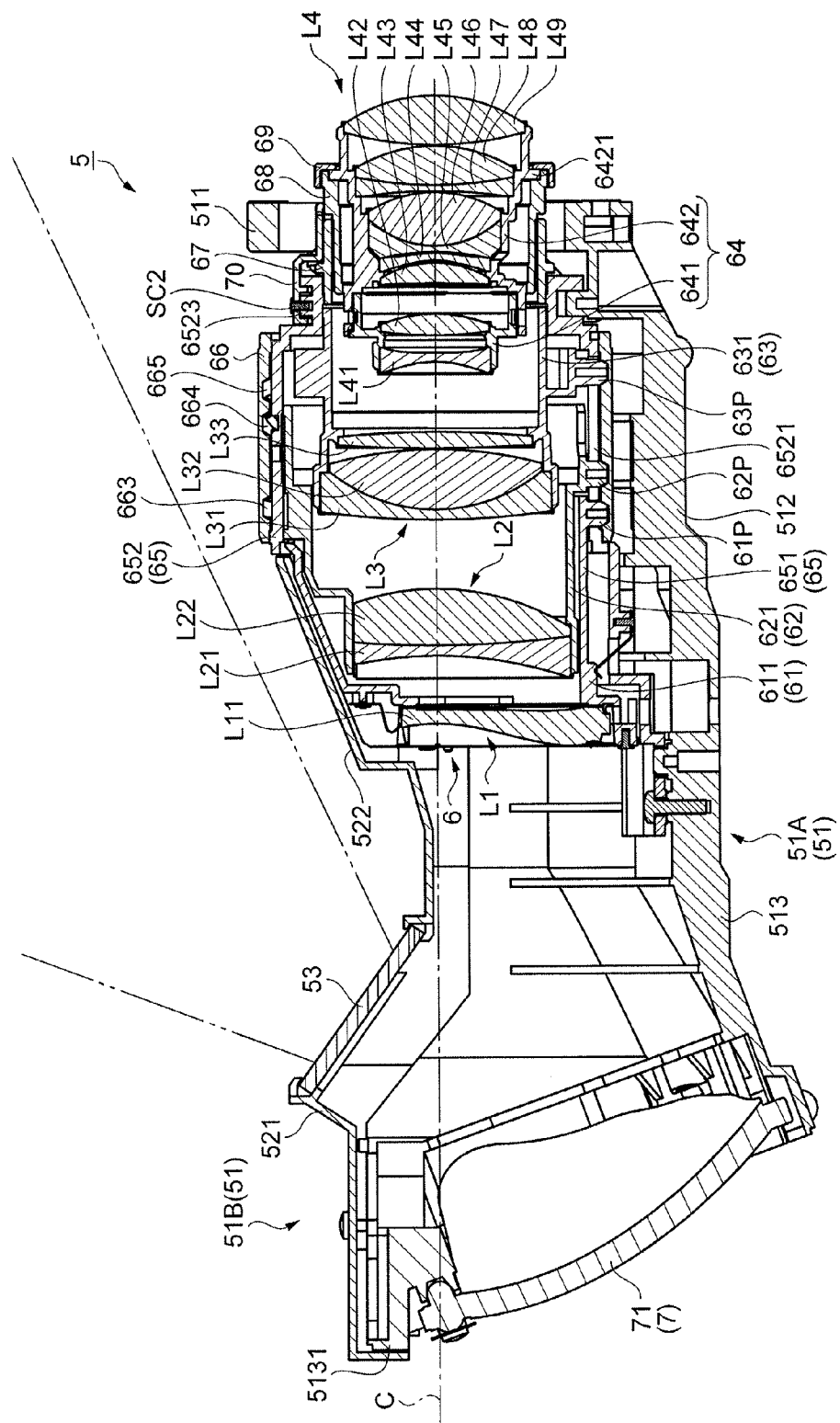
FIG. 4 is a schematic cross-sectional view of the projection optical apparatus.

FIG. 3 is a perspective view of the projection optical apparatus 5. FIG. 4 is a schematic cross-sectional view of the projection optical apparatus 5. FIG. 3 shows the projection optical apparatus 5 with a cover 51B, which will be described later, removed.

The projection optical apparatus 5 is configured in the form of an optical system formed of a combination of a first optical system 6 (refractive system) and a second optical system 7 (reflective system), as a projection system, as shown in FIGS. 3 and 4. In the projection optical apparatus 5 according to the present embodiment, the first optical system 6 refracts the image light having exited out of the cross dichroic prism 354, and the second optical system 7, which is formed of an aspheric reflection mirror 71, reflects the image light and projects it on the screen SC. The projection optical apparatus 5 includes, as the first optical system 6, a plurality of lens groups each of which is formed of one or more lenses, and the lens groups are arranged along an optical axis C. The projection optical apparatus 5 according to the present embodiment is configured as a short-focal-length projection optical apparatus, and the first optical system 6 has a function of performing focus adjustment on the image light incident thereon.

For ease of description, in FIG. 3 and the following figures, the light incident side where the image light is incident on the first optical system 6 of the projection optical apparatus 5 is called a rear side, and the light exiting side where the image light exits out of the first optical system 6 is called a front side. Further, in FIG. 3, the upward direction with respect to the plane of view is called an upper side, and the downward direction with respect to the plane of view is called a lower side. Still further, the rightward and leftward directions viewed from the side facing the light exiting side, where the image light exits out of the first optical system 6, is called right and left sides, respectively, which are used in the description as appropriate. The projection optical apparatus 5 is therefore installed with the upper and lower sides reversed and the right and left sides reversed in FIG. 1. In this state, the upper and lower sides of the projector 1 are reversed, and the right and left sides thereof are reversed.

The projection optical apparatus 5 generally includes, in addition to the first optical system 6 and the second optical system 7, a projection optical apparatus enclosure 51, which forms a base of the apparatus and accommodates the first optical system 6 and the second optical system 7, and a light transmissive plate 53, which transmits light reflected off the reflection mirror 71 (projection light). The projection optical apparatus enclosure 51 has an enclosure body 51A, which has an opening section on the upper side and accommodates the first optical system 6 and the second optical system 7, and a cover 51B, which covers the upper side of the enclosure body 51A and holds the light transmissive plate 53.

Figure 5:
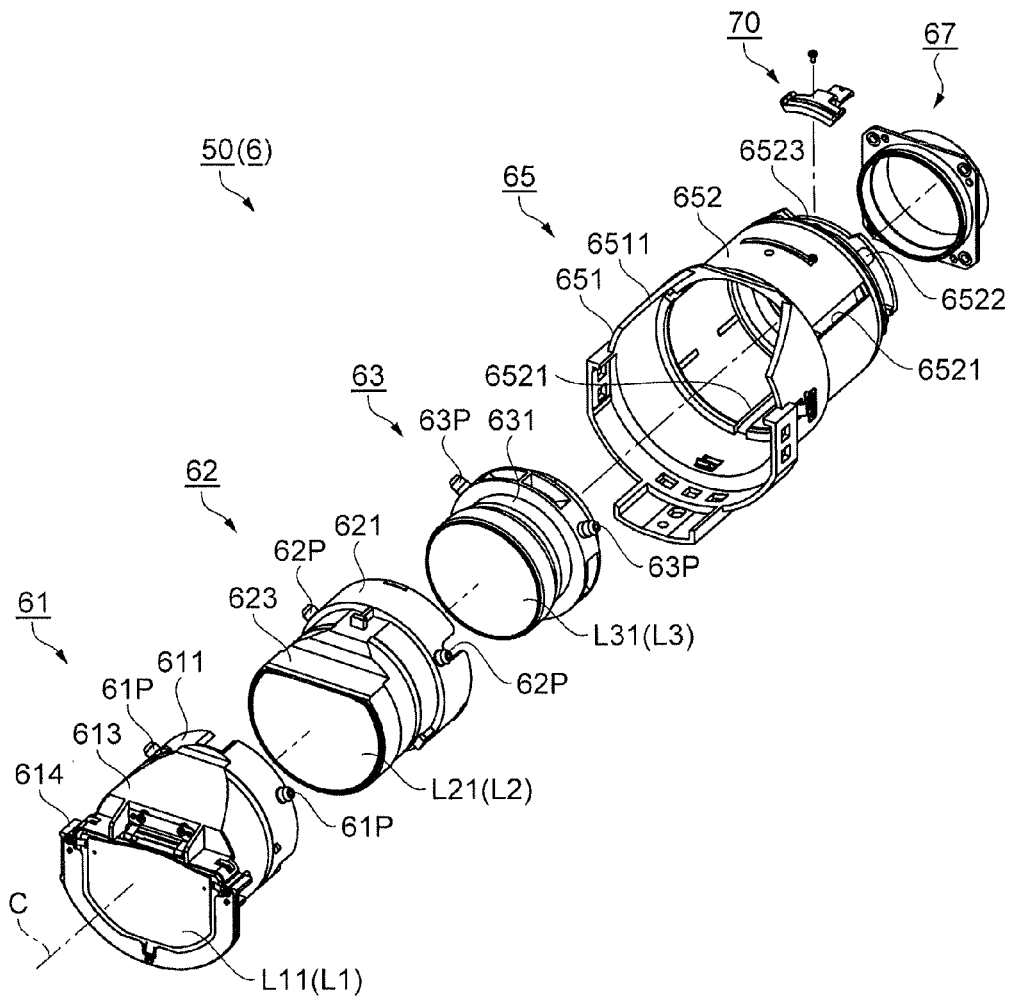
FIG. 5 is an exploded perspective view of the projection optical apparatus.
Figure 6:
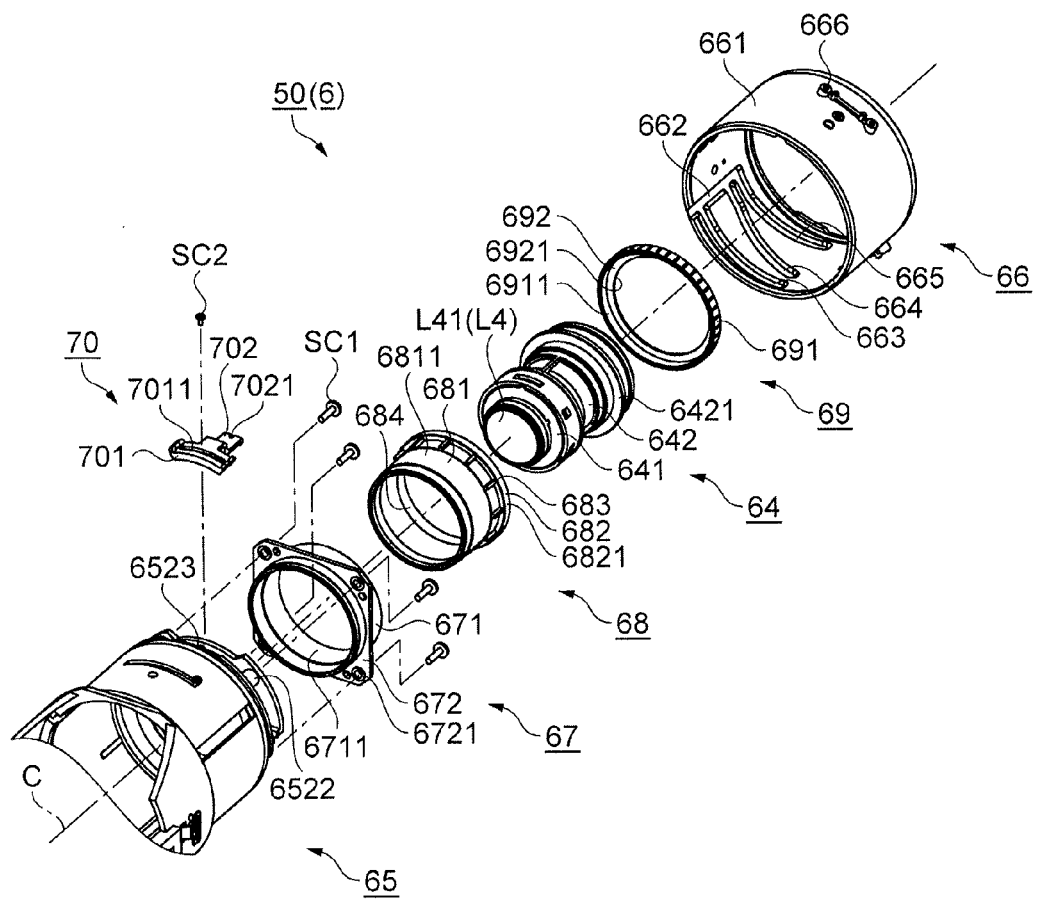
FIG. 6 is another exploded perspective view of the projection optical apparatus.

FIGS. 5 and 6 are exploded perspective views of a projection optical unit 50 (first optical system 6). FIG. 5 primarily shows the front side of the first optical system 6, and FIG. 6 primarily shows the rear side of the first optical system 6. The first optical system 6 includes a guide barrel 65, a cam barrel 66, a first lens group L1 to a fourth lens group L4, which are arranged sequentially from the front side along the optical axis C, and a first lens frame 61 to a fourth lens frame 64, which hold the corresponding lens groups L1 to L4, respectively, as shown in FIGS. 4 to 6.

In the projection optical apparatus 5, the first optical system 6 optically processes the image light incident through the fourth lens group L4 and outputs the processed image light through the first lens group L1 toward the reflection mirror 71 in the second optical system 7, and the reflection mirror 71 reflects the outputted image light to output the reflected image light as projection light in a direction upward with respect to the first lens group L1. Among the first lens group L1 to the fourth lens group L4, the first lens group L1 is the forefront lens group, which outputs light toward the reflection mirror 71, in the first optical system 6.

The enclosure body 51A of the projection optical apparatus enclosure 51 is formed of a flange 511, which is disposed at the light-incident-side end, a first accommodation section 512, which extends frontward from the flange 511, and a second accommodation section 513, which extends from the first accommodation section 512 and spreads on the front side. The flange 511 has a rectangular shape in a plan view, and the electro-optical apparatus 35 is fixed to the rear end surface of the flange 511. The flange 511 has an insertion hole 5111 formed in a central portion thereof, and the rear side of the fourth lens frame 64, which holds the fourth lens group L4, is inserted through the insertion hole 5111.

The first accommodation section 512 has a roughly half-cylindrical shape so formed that a roughly cylindrical shape has the upper side above the central axis of the cylindrical shape cut therefrom, and the first accommodation section 512 accommodates the first optical system 6. Fixing sections 5121 for fixing the projection optical apparatus 5 to a fixing member (not shown) in the projector 1 are formed at the upper end of the first accommodation section 512 on the front and rear sides thereof and extend in the rightward/leftward direction.

The second accommodation section 513 has a roughly half-cylindrical shape (half-frustum shape) so formed that a tubular shape that spreads on the front side has the upper side above the central axis of the tubular shape cut therefrom. A front end 5131 of the second accommodation section 513 is open, and the reflection mirror 71 is disposed on an inner surface of the second accommodation section 513 in the vicinity of the front end 5131.

The cover 51B of the projection optical apparatus enclosure 51 is so disposed as to cover part of the upper side of the enclosure body 51A, that is, a portion thereof from the front end 5131 of the second accommodation section 513 roughly to a front-side middle position of the first accommodation section 512, as shown in FIG. 4. The cover 51B generally includes a light transmissive plate holding section 521, which holds the light transmissive plate 53, which has a rectangular shape and is transparent so as to transmit the projection light reflected off the reflection mirror 71, in such a way that the light transmissive plate 53 is roughly perpendicular to a projection optical axis that is a line connecting the centers of the projection light flux therealong, and an inclined section 522, which is so inclined not as to block the projection light having passed through the light transmissive plate 53. The cover 51B is fixed to the upper end of the enclosure body 51 with screws. The cover 51B fixed to the enclosure body 51A prevents light having exited out of the first optical system 6 and other light inside the enclosure body 51A from leaking out thereof.

The guide barrel 65 is formed of a front cylindrical section 651 and a rear cylindrical section 652, as shown in FIGS. 3 to 6. Straight grooves 6521 are formed in the side surface of the rear cylindrical section 652, and each of the straight grooves 6521 is a cutout formed in the side surface from the front side toward the rear side along the direction of the optical axis C. The straight grooves 6521 are formed of three straight grooves formed in the side surface of the rear cylindrical section 652 at equal angular intervals of 120° in the circumferential direction around the optical axis C. Four fixing sections 6522, each of which has a threaded hole (not shown) used to fix a first adjustment barrel 67, which will be described later, with a screw, are formed at the rear end of the rear cylindrical section 652. A fixing section 6523, which concentrically protrudes from the rear cylindrical section 652 and has a threaded hole (not shown) used to fix an adjustment fixing member 70, which will be described later, is formed in the vicinity of the rear end of the rear cylindrical section 652.

The front cylindrical section 651 has a cutoff section 6511 formed by cutting an upper portion of the front cylindrical section 651 in correspondence with the inclined section 522, which is part of the cover 51B and so formed not as to interfere with the projection light from the reflection mirror 71. The front cylindrical section 651 covers the outer circumferential side of the first lens frame 61 and the second lens frame 62, which protrude frontward from the rear cylindrical section 652. The guide barrel 65 is fixed to an inner portion of the enclosure body 51A with screws.

The cam barrel 66 has a cylindrical shape, and the rear cylindrical section 652 of the guide barrel 65 is inserted and fit into the cam barrel 66 so that the cam barrel 66 is pivotable around the optical axis C relative to the guide barrel 65. The cam barrel 66 is formed of a holding section 661 having a cylindrical shape. In the inner circumferential surface of the holding section 661 are formed guide grooves 662, each of which is a cutout formed from the front end toward the rear side along the direction of the optical axis C, and cam grooves 663, 664, and 665, which are formed along predetermined paths to define movement of the first lens group L1 to the third lens group L3. The guide grooves 662 and the cam grooves 663, 664, and 665 are formed of three sets of guide groove 662 and cam grooves 663, 664, and 665 that are formed in the inner circumferential surface of the holding section 661 at equal angular intervals of 120° in the circumferential direction around the optical axis C.

A fixing section 666, which fixes a lever member that is not shown, is formed on the outer circumferential surface of the cam barrel 66. To perform focus adjustment, the lever member is caused to pivot. The cam barrel 66 is thus caused to pivot relative to the guide barrel 65 for the focus adjustment.

The first lens group L1, the second lens group L2, and the third lens group L3 are held by the first lens frame 61, the second lens frame 62, and the third lens frame 63, respectively, which are then inserted and fit into the guide barrel 65 so as to be movable along the optical axis C, as shown in FIG. 4. Cam pins 61P, 62P, and 63P are formed on the lens frames 61, 62, and 63, respectively, and the cam pins 61P, 62P, and 63P engage with the straight grooves 6521 in the guide barrel 65 and the cam grooves 663, 664, and 665 in the cam barrel 66.

The lens frames 61, 62, and 63 move along the direction of the optical axis C when the cam pins 61P, 62P, and 63P are guided to the intersections of the straight grooves 6521 and the cam grooves 663, 664, and 665 in response to the pivotal motion of the cam barrel 66.

The fourth lens group L4 is held by the fourth lens frame 64, as shown in FIG. 4. The fourth lens frame 64 is inserted and fit into the guide barrel 65 via a first adjustment barrel 67, a second adjustment barrel 68, and an adjustment ring 69. In the projection optical apparatus 5, focus adjustment is performed on the image light by movement of the lens groups L1, L2, and L3.

In the following sections, the configuration of each of the members that form the projection optical unit 50 (first optical system 6) and assembly of the members will be described.

Configurations of First Lens Group L1 and First Lens Frame 61

The first lens group L1 is formed of a single aspheric lens (called first lens L11). The first lens L11 is a lens located in a position closest to the second optical system 7 among the plurality of lenses provided in the first optical system 6. The first lens L11 is so shaped that a circular shape in a plan view is cut in a predetermined position on the upper side above the optical axis C and in parallel to the optical axis C. The first lens L11 is further so shaped that the shape described above is cut vertically in predetermined positions in the rightward/leftward direction.

The first lens frame 61 includes a holding section 611, which holds the first lens group L1, and the cam pins 61P. The holding section 611 has a roughly cylindrical shape. An inclined section 613 is formed in a front upper portion of the outer circumferential surface of the holding section 611 in accordance with the inclined section 522 of the cover 51B.

An accommodation section 614, which accommodates the first lens L11, is formed in a front end portion of the holding section 611.

The cam pins 61P are so formed to protrude outward from the outer circumferential surface of a rear end portion of the holding section 611 in directions that intersect the optical axis C. The cam pins 61P are formed of three cam pins provided at equal angular intervals pf 120° in the circumferential direction around the optical axis C. Each of the cam pins 61P has a cylindrical columnar shape and is so tapered that a front end portion thereof narrows. The first lens L11 and the first lens frame 61 will be described later in detail.

Configurations of Second Lens Group L2 and Second Lens Frame 62

The second lens group L2 is formed of a doublet having a second lens L21 and a third lens L22 bonded to each other, and theses lenses are cut at a predetermined distance upward from the optical axis C and in parallel to the optical axis C. The second lens frame 62 includes a holding section 621, which holds the second lens group L2, and the three cam pins 62P, which is substantially the same configuration as that of the first lens frame 61. A stepped section 623 is formed in a front upper portion of the outer circumferential surface of the holding section 621 in accordance with the inclined section 522 of the cover 51B. The second lens group L2 and the holding section 621 are caused to undergo a thermal caulking process in such away that the second lens group L2 is held by the inner circumferential surface of a front end portion of the holding section 621 where the stepped section 623 is formed.

Configurations of Third Lens Group L3 and Third Lens Frame 63

The third lens group L3 is formed of three lenses, a fourth lens L31, a fifth lens L32, and a sixth lens L33, and the fourth lens L31 and the fifth lens L32 are bonded to each other into a doublet. The third lens frame 63 includes a holding section 631, which holds the third lens group L3, and the three cam pins 63P, which is substantially the same configuration as that of the first lens frame 61. The third lens group L3 and the holding section 631 are caused to undergo a thermal caulking process in such a way that the third lens group L3 is held in a predetermined position of a front inner circumferential surface of the holding section 631.

Configurations of Fourth Lens Group L4 and Fourth Lens Frame 64

The fourth lens group L4 is formed of nine lenses, a seventh lens L41 to a fifteenth lens L49, as shown in FIGS. 4 and 6. The fourth lens frame 64 is formed of a first divided frame 641 and a second divided frame 642 divided from each other with reference to the position of an aperture (not shown). The first divided frame 641 holds the seventh lens L41 and the eighth lens L42, and the second divided frame 642 holds the aperture and the ninth lens L43 to the fifteenth lens L49. The fourth lens frame 64 has a flange 6421 formed in a roughly middle position of the second divided frame 642 and around the outer circumferential surface thereof, and the flange 6421 protrudes in a direction that intersects the optical axis C. The first divided frame 641 and the second divided frame 642 are caused to undergo optical axis adjustment (optical axis alignment) after the lenses described above are fixed into the barrels that form the first divided frame 641 and the second divided frame 642. The first divided frame 641 and the second divided frame 642 are then fixed to and integrated with each other with an adhesive.

Assembly of Guide Barrel 65, Third Lens Frame 63, Second Lens Frame 62, and First Lens Frame 61

Assembling operation is performed as follows: The cam pins 63P of the third lens frame 63 are first caused to engage, from the front side, with the straight grooves 6521 in the guide barrel 65, and the third lens frame 63 is inserted into the inner surface of the rear cylindrical section 652, as shown in FIGS. 4 to 6. The cam pins 62P of the second lens frame 62 are then caused to engage, from the front side, with the straight grooves 6521, and the second lens frame 62 is inserted into the inner surface of the rear cylindrical section 652, as in the assembly of the third lens frame 63. The following state is thus achieved: Part of the holding section 631 of the third lens frame 63, that is, a region that holds the third lens group L3 (front region of holding section 631) is inserted into a rear inner circumferential surface of the holding section 621 of the second lens frame 62, as shown in FIG. 4.

The cam pins 61P of the first lens frame 61 are then caused engage, from the front side, with the straight grooves 6521, and the first lens frame 61 is inserted into the inner surface of the rear cylindrical section 652, as in the assembly of the second lens frame 62, as shown in FIG. 4. The following state is thus achieved: Part of the holding section 621 of the second lens frame 62, that is, a region that holds the second lens group L2 (front region of holding section 621) is inserted into the inner circumferential surface of the holding section 611 of the first lens frame 61.

As a result, the first lens frame 61, the second lens frame 62, and the third lens frame 63 have been held by the guide barrel 65 with the cam pins 61P, 62P, and 63P engaging therewith. Further, a front end portion of each of the cam pins 61P, 62P, and 63P have protruded from the straight grooves 6521 in the guide barrel 65.

Assembly of Guide Barrel 65 and Cam Barrel 66

The cam barrel 66 is so assembled that the protruding front end portions of the cam pins 61P, 62P, and 63P of the first lens frame 61, the second lens frame 62, and the third lens frame 63 that engage with and are held by the guide barrel 65 are guided through the guide grooves 662 to allow the guide barrel 65 to be inserted through the front side of the cam barrel 66. The rear cylindrical section 652 of the guide barrel 65 is thus inserted into the cam barrel 66. The cam barrel 66 is pivotable around the optical axis C relative to the guide barrel 65.

Adjustment of Fourth Lens Frame 64 in Projection Optical Apparatus 5

The fourth lens frame 64 (fourth lens group L4) is a fixed lens group in the first optical system 6 but is pivotable relative to the guide barrel 65, allowing the position thereof to be adjusted (back focus adjustment) relative to the movable first lens frame 61 to third lens frame 63 (first lens group L1 to third lens group L3). The first adjustment barrel 67, the second adjustment barrel 68, and the adjustment ring 69 are members that allow pivotal motion of the fourth lens frame 64, and the adjustment fixing member 70 is a member that fixes the fourth lens frame 64, after the adjustment, to the guide barrel 65 in an adjusted position.

Configuration of First Adjustment Barrel 67

The first adjustment barrel 67 is formed of a holding section 671, which has a cylindrical shape, and a flange 672, which has a rectangular shape in a plan view and is formed around the outer circumferential surface of the holding section 671, as shown in FIGS. 5 and 6. A threaded groove 6711 is formed in the inner surface of the holding section 671. Holes 6721 are formed in four corner portions of the flange 672. The first adjustment barrel 67 is fixed as follows: The front side of the holding section 671 is inserted through the rear end side of the rear cylindrical section 652 of the guide barrel 65; the flange 672 is caused to come into contact with the rear end of the rear cylindrical section 652; and screws SC1 are inserted through the holes 6721 in the flange 672 and threaded into the threaded holes (not shown) of the fixing sections 6522 provided at the rear end of the rear cylindrical section 652.

Configuration of Second Adjustment Barrel 68

The second adjustment barrel 68 includes a cylindrical holding section 681, a projecting section 682 formed at the rear end of the outer circumferential surface of the holding section 681, fixing protrusions 683 formed on the outer circumferential surface and in front of the projecting section 682, and a recessed section 684 formed at the rear end of the inner circumferential surface of the holding section 681, as shown in FIG. 6. The fixing protrusions 683 are so formed as to be parallel to the optical axis C and protrude in directions that intersect the optical axis C and are so provided as to be arranged at equal intervals in the circumferential direction around the optical axis C. Further, a threaded groove 6821 is formed in the outer circumferential surface of the projecting section 682, and a threaded section 6811 is formed on a front outer circumferential surface of the holding section 681.

Configuration of Adjustment Ring 69

The adjustment ring 69 includes a holding section 691, which has a ring-like shape, and a fixing section 692, which extends from the rear end of the holding section 691 toward the optical axis C and forms an opening section 6921, as shown in FIG. 6. A threaded section 6911 is formed in the inner circumferential surface of the holding section 691.

Configuration of Adjustment Fixing Member 70

The adjustment fixing member 70 includes a fixing body 701, which has a roughly rectangular shape in a plan view and is curved along the outer circumferential surface of the fixing section 6523 of the guide barrel 65, and a fixing piece 702, which extends rearward from the center of the rear end of the fixing body 701 and is provided in the form of a stepped section that approaches the optical axis C, as shown in FIGS. 5 and 6. A slit-shaped hole 7011 is formed in the fixing body 701 along the circumferential direction. A cutout 7021 is formed in a rear end portion of the fixing piece 702, and the cutout 7021 is so cut as to sandwich any of the fixing protrusions 683 of the second adjustment barrel 68 in the pivotal direction.

Assembly of Fourth Lens Frame 64 to Guide Barrel 65

First, the fourth lens frame 64 having undergone the optical axis adjustment is inserted through the rear end of the second adjustment barrel 68 and fit therein, and the flange 6421 of the fourth lens frame 64 is positioned at the recessed section 684 of the second adjustment barrel 68. The adjustment ring 69 (opening section 6921) is then inserted through the rear end of the fourth lens frame 64, and the threaded section 6911 of the adjustment ring 69 is threaded into the threaded groove 6821 in the second adjustment barrel 68. The fourth lens frame 64 is thus sandwiched between the second adjustment barrel 68 and the adjustment ring 69 and fixed thereto.

The fourth lens frame 64 sandwiched between the second adjustment barrel 68 and the adjustment ring 69 is then inserted, from the front side of the fourth lens frame 64, into the holding section 671 of the first adjustment barrel 67 fixed to the rear end of the guide barrel 65. The threaded section 6811 of the second adjustment barrel 68 is then threaded into the threaded groove 6711 in the first adjustment barrel 67. The fourth lens frame 64 is thus fixed to the guide barrel 65.

The projection optical unit 50 (first optical system 6) is thus assembled in accordance with the assembling procedure described above. To perform back focus adjustment, which will be described later, the projection optical unit 50 is first fixed to the projection optical apparatus enclosure 51 (enclosure body 51A), followed by the back focus adjustment.

Back Focus Adjustment Using Fourth Lens Group L4

The fourth lens frame 64 (fourth lens group L4) is pivotable relative to the guide barrel 65 (first adjustment barrel 67), as described above. In the present embodiment, the fourth lens frame 64 can be caused to pivot for the back focus adjustment of the projection optical apparatus 5. The back focus adjustment is performed by projection of light incident from the reduction side (image light) via the projection optical apparatus 5 and pivotal motion of the fourth lens frame 64 via visual recognition of the projected image.

To cause the fourth lens frame 64 to pivot, the holding section 691 of the adjustment ring 69 is caused to pivot with the holding section 691 grasped. Pivotal motion of the adjustment ring 69 changes the state in which the second adjustment barrel 68 (threaded section 6811) engages with the first adjustment barrel 67 (threaded groove 6711). As a result, the fourth lens frame 64, including the second adjustment barrel 68 and the adjustment ring 69, pivots relative to the first adjustment barrel 67 (guide barrel 65).

Fixation of Fourth Lens Frame 64

After the back focus adjustment using the fourth lens frame 64 is completed, the adjustment fixing member 70 is used to fix the fourth lens frame 64 to the guide barrel 65. In detail, the fixing body 701 of the adjustment fixing member 70 is placed at a predetermined location or on the fixing section 6523 of the guide barrel 65. At this point, the cutout 7021 is allowed to sandwich any of the fixing protrusions 683 of the second adjustment barrel 68. In the present embodiment, the pivotal motion of the fourth lens frame 64 is performed stepwise and the length of one stepwise motion is not an arbitrary value but is equal to the distance between the fixing protrusions 683 (angle of 30°).

Thereafter, in the state in which the cutout 7021 of the adjustment fixing member 70 sandwiches any of the fixing protrusions 683 of the second adjustment barrel 68, a screw SC2 is inserted through the hole 7011 and threaded into the threaded hole provided in the fixing section 6523 of the guide barrel 65. The fourth lens frame 64 can thus be fixed to the guide barrel 65.

Figure 7:
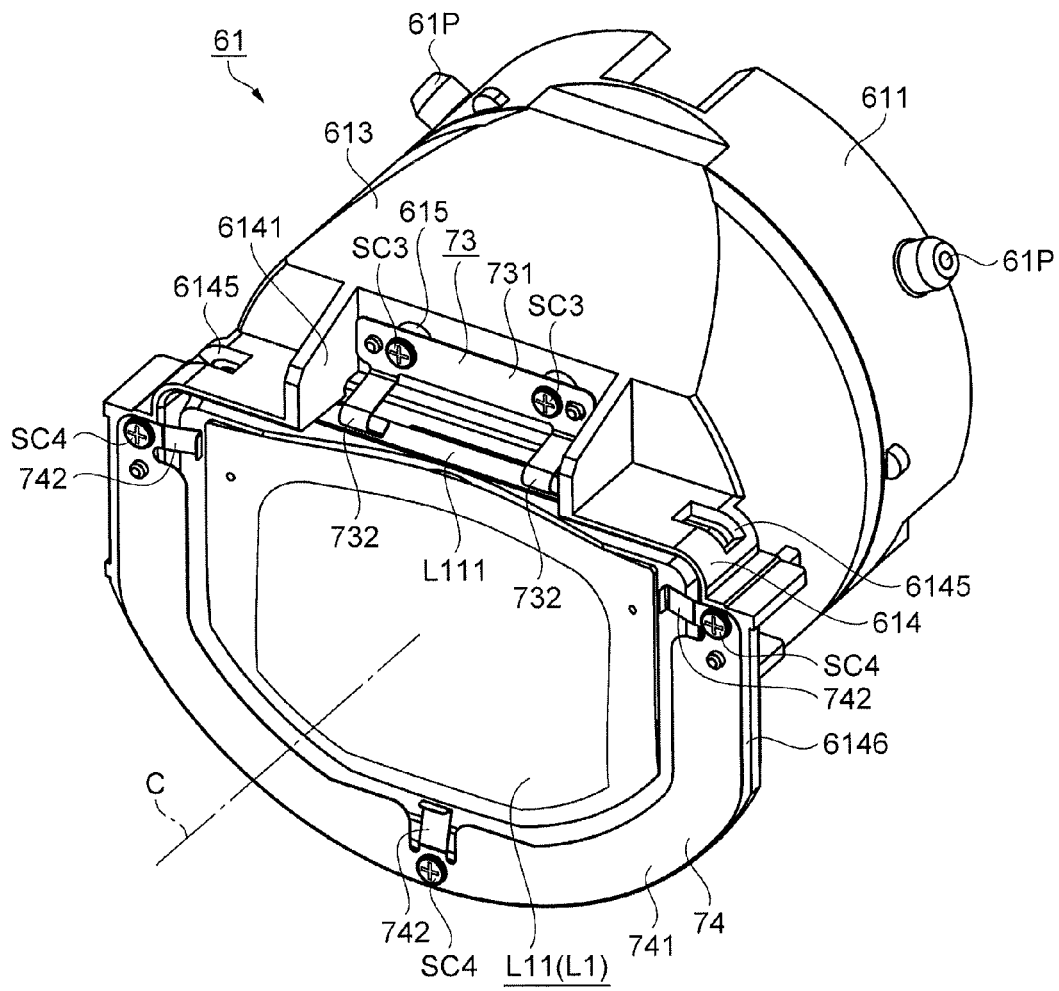
FIG. 7 is a perspective view of a first lens group and a first lens frame.
Figure 8:
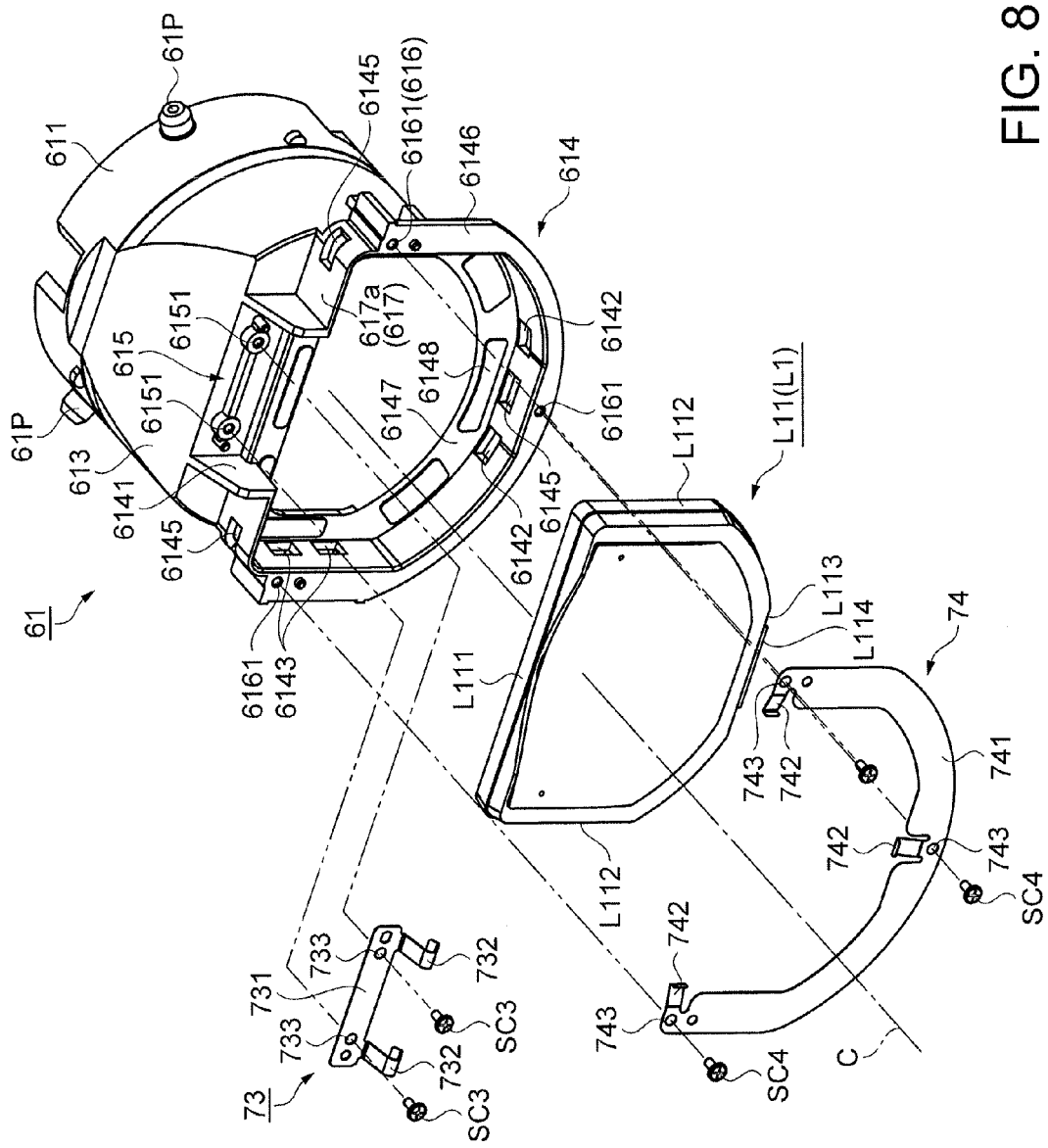
FIG. 8 is an exploded perspective view of the first lens group and the first lens frame.
Figure 9B:
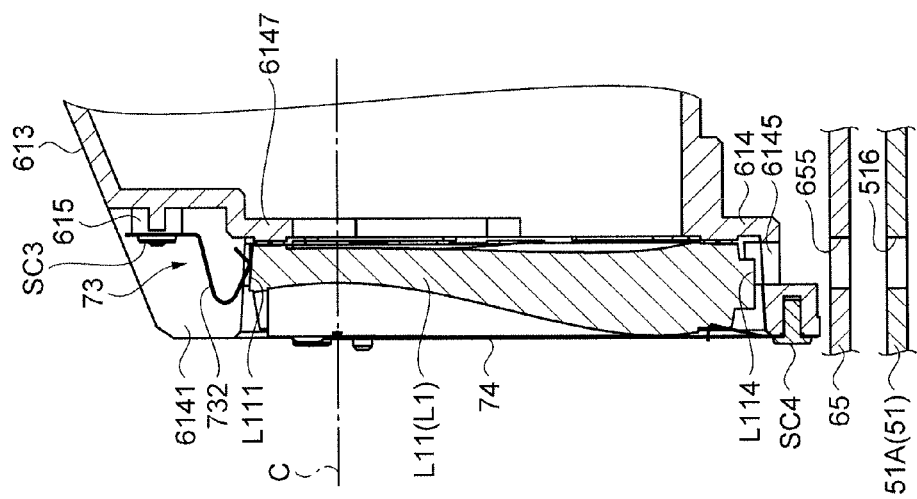
FIGS. 9A and 9B are cross-sectional views showing a pressing section, opening sections, and fixing opening sections taken along a plane including an optical axis.
Figure 9A:
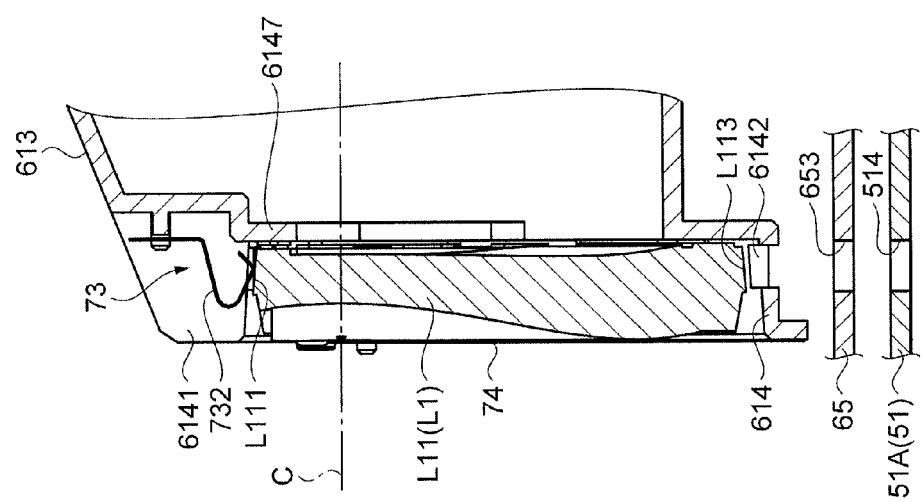
Figure 10:
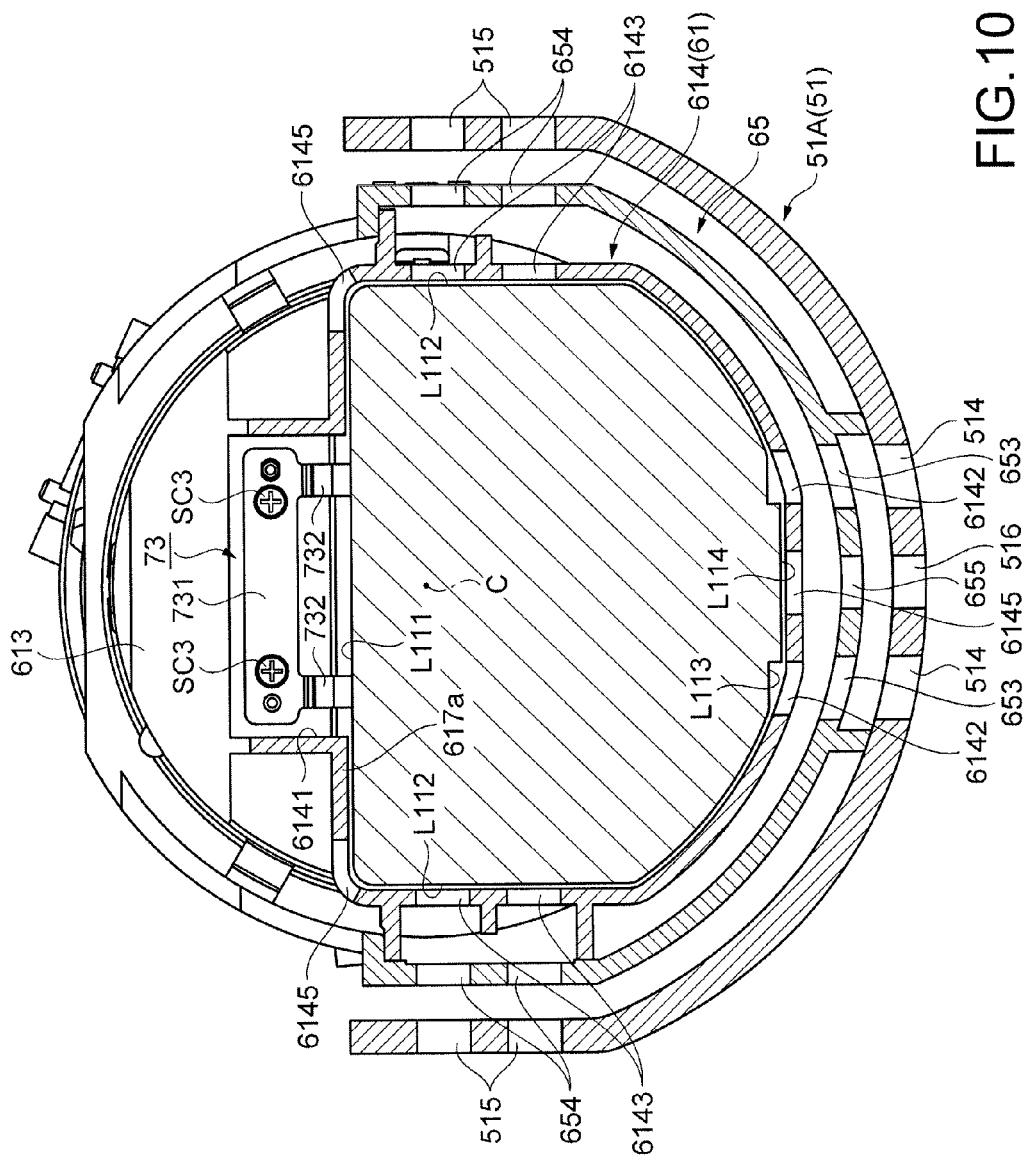
FIG. 10 is a cross-sectional view showing the pressing section, the opening sections, and the fixing opening sections taken along a plane perpendicular to the optical axis.

FIG. 7 is a perspective view of the first lens group L1 and the first lens frame 61. FIG. 8 is an exploded perspective view of the first lens group L1 and the first lens frame 61. FIGS. 7 and 8 are a perspective view and an exploded view, respectively, viewed from the front side. FIGS. 9A and 9B are cross-sectional views showing a pressing section, opening sections, and fixing opening sections taken along a plane including the optical axis C. FIG. 9A primarily shows a pressing section (upper pressing member 73), a first opening section 6142, a second opening section 514, and an opening section 653, and FIG. 9B primarily shows the pressing section (upper pressing member 73), a first fixing opening section 6145, a second fixing opening section 516, and an opening section 655. FIG. 10 is a cross-sectional view showing the pressing section, the opening sections, and the fixing opening sections taken along a plane perpendicular to the optical axis C. Adjustment of the position of the first lens L11 and fixation thereof will be described with reference to FIGS. 4 to 10.

Configuration of First Lens L11

The first lens L11 is formed of an aspheric lens made of a synthetic resin material in the present embodiment. The first lens L11 has a region horizontally cut off, and the cut-off region is a portion on the side above the optical axis C, that is, the side where the projection light reflected off the reflection mirror 71 passes but is a portion that is not involved in the light incident from the second lens group L2. The portion forms a first lens cutoff section L111 as a lens cutoff section. In other words, the first lens cutoff section L111 is so shaped that part of the first lens L11 is cut off in a predetermined position or a position where interference with the projection light reflected off the reflection mirror 71 is avoided.

Further, right and left regions of the first lens L11 that are not involved in the light incident from the second lens group L2 are cut off along the vertical direction symmetrically with respect to the optical axis C, as shown in FIG. 8. The cut-off portions form second lens cutoff sections L112. The first lens L11 further has a third lens cutoff section 113, which is a horizontally cut-off portion, on the side opposite the first lens cutoff section L111. A protruding section L114, which is formed due to the presence of a gate of a die for molding the first lens L11, is formed on the third lens cutoff section L113.

Configuration of First Lens Frame 61

The first lens frame 61 includes the holding section 611, which holds the first lens group L1, and the cam pins 61P, as described above. The holding section 611 is so formed as to have a roughly cylindrical shape. The inclined section 613 is formed in a front upper portion of the outer circumferential surface of the holding section 611 in accordance with the inclined section 522 of the cover 51B. The inclined section 613 is, in other words, a region so configured that part of the first lens frame 61 is cut off in a predetermined position or a position where interference with the projection light reflected off the reflection mirror 71 is avoided. Further, the accommodation section 614, which accommodates the first lens L11, is formed on a front end side of the holding section 611.

The accommodation section 614 has an open front side, has an inner circumferential surface having a shape similar to the shape of the outer circumferential surface of the first lens L11, and accommodates the first lens L11 inserted from the front side, as shown in FIG. 8. A recessed vacant section 617, which is recessed from the inclined section 613 and has a cutout-like shape, is formed on the upper side of the accommodation section 614. The recessed vacant section 617 has a wall section 617a positioned outside the first lens cutoff section L111, and an open section 6141, which exposes part of the first lens cutoff section L111, is formed in a central portion of the wall section 617a. The first lens frame 61 is accommodated in the guide barrel 65 with the inclined section 613 and the recessed vacant section 617 exposed through the cutoff section 6511 (see FIG. 3). That is, the guide barrel 65 is so formed as to expose the open section 6141.

As shown in FIG. 8, the accommodation section 614 has a fixing section 615 formed on the side surface of a portion where the open section 6141 and the inclined section 613 are connected to each other, and the fixing section 615 protrudes frontward and receives and fixes an upper pressing member 73, which will be described later. The fixing section 615 has two threaded holes 6151 in correspondence with holes 733 in the upper pressing member 73, which will be described later. The accommodation section 614 further has a fixing section 616 formed on a front end surface 6146, and the fixing section 616 receives and fixes a front pressing member 74, which will be described later. Three threaded holes 6161 are formed in the fixing section 616 in correspondence with holes 743 in the front pressing member 74, which will be described later.

The accommodation section 614 has a receiving section 6147 formed and uniformly extending therein. The receiving section 6147 has a plurality of receiving surfaces 6148 formed thereon, which protrude frontward. The receiving surfaces 6148 serve as surfaces that receive a peripheral portion of the rear surface of the first lens L11 when the first lens L11 is placed in the accommodation section 614, and the receiving surfaces 6148 restrict rearward movement of the first lens L11.

Configurations of First Opening Section 6142 and Third Opening Section 6143

The accommodation section 614 has first opening sections 6142, which expose a first side surface of the first lens L11 (surface of third lens cutoff section L113) that is a surface opposite the first lens cutoff section L111, as shown in FIG. 8. The first opening sections 6142 are formed of two rectangular holes located on the lower side of the accommodation section 614 and symmetrically disposed with respect to a vertical plane including the optical axis C. The accommodation section 614 further has a pair of third opening sections 6143, which expose the right and left second lens cutoff sections L112, that is, a pair of second side surfaces located along a second direction that intersects a first direction oriented from the first lens cutoff section L111 toward the first side surface. The third opening sections 6143 are formed of two rectangular holes, as in the case of the first opening sections 6142.

Configurations of Opening Sections 653 and Second Opening Sections 514

The guide barrel 65 and the projection optical apparatus enclosure 51 (enclosure body 51A) are so formed as to expose the first opening sections 6142, as shown in FIGS. 9A and 9B and FIG. 10. Specifically, the guide barrel 65 has opening sections 653, which expose the first opening sections 6142, and the projection optical apparatus enclosure 51 has second opening sections 514, which expose the first opening sections 6142. The opening sections 653 in the guide barrel 65 are formed of two rectangular holes symmetrically disposed with respect to a vertical plane including the optical axis C, as in the case of the first opening sections 6142. The second opening sections 514 in the projection optical apparatus enclosure 51 are also configured in the same manner as the first opening sections 6142.

Configurations of Fourth Opening Sections 654 and 515

Each of the guide barrel 65 and the projection optical apparatus enclosure 51 (enclosure body 51A) has two fourth opening sections (the fourth opening sections of the guide barrel 65 are called fourth opening sections 654, and the fourth opening sections of the projection optical apparatus enclosure 51 are called fourth opening sections 515) on each side that face the right and left third opening sections 6143. The fourth opening sections 654 in the guide barrel 65 are formed in positions facing each other and roughly symmetrically with respect to a vertical plane including the optical axis C in the present embodiment, as in the case of the third opening sections 6143. The fourth opening sections 654 on each side are formed as two rectangular holes. The fourth opening sections 515 in the projection optical apparatus enclosure 51 are also configured in the same manner as the third opening sections 6143.

Configuration of First Fixing Opening Sections 6145

The accommodation section 614 has a plurality of first fixing opening sections 6145, which expose the side surface of the first lens L11 and allow fixation of the first lens L11 having undergone positional adjustment. In detail, the plurality of first fixing opening sections 6145 are formed as holes located above and below the first lens L11, as shown in FIGS. 8 and 10. Specifically, the first fixing opening sections 6145 on the upper side are formed of two opening sections that expose the side surfaces of corner portions formed by the first lens cutoff section L111 and the right and left second lens cutoff sections L112. The first fixing opening section 6145 on the lower side is formed of one rectangular hole that exposes the side surface of the first lens L11 on the side where the third lens cutoff section L113 is present.

Configurations of Second Fixing Opening Section 516 and Opening Section 655

The guide barrel 65 has an opening section 655, which exposes the first fixing opening section 6145 on the lower side, and the projection optical apparatus enclosure 51 (enclosure body 51A) has a second fixing opening section 516, which exposes the first fixing opening section 6145 on the lower side, as shown in FIG. 10. The first fixing opening sections 6145 on the upper side are exposed through the opening of the enclosure body 51A of the projection optical apparatus 5 from which the cover 51B is removed (see FIG. 3). As described above, the guide barrel 65 is so formed to expose the lower first fixing opening section 6145, and the projection optical apparatus enclosure 51 includes the second fixing opening section 516, which exposes the lower first fixing opening section 6145.

Configuration of Pressing Section (Upper Pressing Member 73)

The first lens frame 61 is provided with the upper pressing member 73 as a pressing section that has elasticity and presses the first lens cutoff section L111, which is the upper side of the first lens L11, in a direction roughly perpendicular to the optical axis C, as shown in FIG. 8. The upper pressing member 73 is formed by bending a metal plate. The upper pressing member 73 is formed of a member body 731, which has a rectangular shape in a plan view, and two spring sections 732, which extend downward from opposite end portions of the member body 731 and are so curved to have elasticity. Further, holes 733, through which screws SC3 are inserted, are formed in opposite end portions of the member body 731.

Configuration of Front Pressing Member 74

The first lens frame 61 is provided with the front pressing member 74, which has elasticity and presses the front surface of the first lens L11 roughly in parallel to the optical axis C, as shown in FIG. 8. The front pressing member 74 is formed by bending a metal plate. The front pressing member 74 includes a member body 741 having a roughly U-like shape in a plan view that accords with the plan-view shape of the first lens L11. The front pressing member 74 further includes three spring sections 742, which are located in a lowest portion and upper opposite end portions of the member body 741, extend inward, and is so curved to have elasticity. Holes 743, through which screws SC4 are inserted, are formed in the member body 741 and in the vicinity of the spring sections 742.

Assembly of First Lens L11 to First Lens Frame 61

In assembling operation, the upper pressing member 73 is first placed on the fixing section 615 of the first lens frame 61. The screws SC3 are then inserted from the front side into the holes 733 of the upper pressing member 73 and threaded into the threaded holes 6151 in the fixing section 615 to fix the upper pressing member 73 to the fixing section 615.

The first lens L11 is then inserted from the front side into the accommodation section 614 of the first lens frame 61. In this process, the first lens L11 is inserted against pressing force produced by the spring sections 732 of the upper pressing member 73. As a result, the following state of the first lens L11 is achieved: The first lens cutoff section L111 exposed through the open section 6141 is pressed downward (toward first opening sections 6142) by the spring sections 732 of the upper pressing member 73. In other words, the first lens L11 is in a state in which it is elastically pressed by the upper pressing member 73 in a direction roughly perpendicular to the optical axis C (a state in which the first lens L11 is elastically pressed in the direction perpendicular to the surface of the first lens cutoff section L111).

The front pressing member 74 is then placed on the front surface of the first lens L11. The screws SC4 are inserted from the front side into the holes 743 of the front pressing member 74 and threaded into the threaded holes 6161 in the front end surface 6146. The first lens L11 is thus fixed in the frontward/rearward direction because the spring sections 742 of the front pressing member 74 cause the peripheral portion of the rear surface of the first lens L11 to be in contact with the receiving surfaces 6148 and press a peripheral portion of the front surface of the first lens L11 rearward in roughly parallel to the direction of the optical axis C.

The thus assembled first lens L11 is accommodated in the accommodation section 614 with the first lens L11 fixed in the upward/downward direction and the frontward/rearward direction, as shown in FIGS. 7, 9A and 9B, and 10.

Adjustment of Position of First Lens L11

The position of the first lens L11 with respect to the optical axis C is adjusted with the first optical system 6 and the second optical system 7 (reflection mirror 71) attached to the enclosure body 51A but the cover 51B not attached to the enclosure body 51A (see FIG. 3). When the position of the first lens L11 is adjusted, the projection optical apparatus 5 is in a state in which the open section 6141 is exposed, as shown in FIG. 3, and the first opening sections 6142 and the pair of third opening sections 6143 are exposed, as shown in FIG. 10. In other words, the guide barrel 65 is so formed as to expose the open section 6141, the first opening sections 6142, and the pair of third opening sections 6143. The projection optical apparatus enclosure 51 has the second opening sections 514, which expose the lower first opening sections 6142 and is configured to be capable of exposing the pair of third opening sections 6143 and the open section 6141.

The positional adjustment is performed as follows: The light (image light) incident from the reduction side on the projection optical unit 50 (first optical system 6) is reflected off the reflection mirror 71 and projected, and the first lens L11 is moved in the upward, downward, rightward, and leftward directions while the projected image is visually recognized. The adjustment of the position of the first lens L11 allows correction of field curvature and other aberrations in a projected image.

Configuration of Tool for Positional Adjustment

In the present embodiment, a tool for the positional adjustment is provided. The adjustment tool includes a first probe (not shown) that is so movable as to come into contact with the surface of the third lens cutoff section L113, which is formed on the lower side of the first lens L11, to move the first lens L11 upward against the pressing force produced by the upper pressing member 73. In the present embodiment, the tool for the positional adjustment further includes second probes (not shown) that are so movable as to come into contact with the second lens cutoff sections L112, which are formed on the right and left sides of the first lens L11, to move the first lens L11 rightward and leftward.

The first probe is formed of a probe (not shown) including no compression spring. The first probe is formed of two probes in correspondence with the two first opening sections 6142. The amounts of movement of the two probes are so adjusted as to be the same.

The second probes are formed of a probe (not shown) including a compression spring and a probe (not shown) including no compression spring. In the present embodiment, the second probes are used to press the second lens cutoff sections L112 in such a way that the probe including a compression spring presses the surface of the left second lens cutoff section L112, and the probe including no compression spring presses the surface of the right second lens cutoff section L112.

In the present embodiment, one of the second probes or the probe including a compression spring is formed of two probes in correspondence with the two third opening sections 6143 on the left side. The two probes are configured in the same manner and press the surface of the left second lens cutoff section L112 rightward. The probe including no compression spring is formed of two probes in correspondence with the two third opening sections 6143 on the right side. The amounts of movement of the two probes are so adjusted as to be the same.

As described above, the first probes and the second probes are so configured that when the first and second probes press the corresponding cutoff sections (third lens cutoff section L113 and second lens cutoff sections L112) of the first lens L11, the surface of each of the cutoff sections is pressed at two locations. In other words, the first opening sections 6142 are formed of two holes and the third opening sections 6143 on each side are formed of two holes so that when the adjustment tool (probes) is used to press the cutoff sections of the first lens L11, the surface of each of the cutoff sections is allowed to be pressed at two locations.

Placement of Adjustment Tool

The two first probes are inserted from the outside of the projection optical apparatus 5 through the second opening sections 514 formed in the projection optical apparatus enclosure 51 (enclosure body 51A) and the opening sections 653 formed in the guide barrel 65, which is located inside the projection optical apparatus enclosure 51, and then inserted through the first opening sections 6142 formed in the accommodation section 614 of the first lens frame 61, as shown in FIG. 10. The front end of each of the probes is then caused to come into contact with the exposed surface of the third lens cutoff section L113 of the first lens L11.

The following state of the first lens L11 is thus achieved: The surface of the first lens cutoff section L111 is elastically pressed against the upper pressing member 73 (two spring sections 732) and the third lens cutoff section L113 is pressed by the first probes at two locations. As a result, the first lens L11 can be held between the first probes and the upper pressing member 73, which faces the first probes.

The two second probes on the left side are inserted from the outside of the projection optical apparatus 5 through the left fourth opening sections 515 formed in the projection optical apparatus enclosure 51 (enclosure body 51A) and the left fourth opening sections 654 formed in the guide barrel 65 and then inserted through the left third opening sections 6143 formed in the accommodation section 614 of the first lens frame 61, as shown in FIG. 10. The front end of each of the probes is then caused to come into contact with the exposed surface of the left second lens cutoff section L112 of the first lens L11.

Further, the two second probes on the right side are inserted from the outside of the projection optical apparatus 5 through the right fourth opening sections 515 formed in the projection optical apparatus enclosure 51 (enclosure body 51A) and the right fourth opening sections 654 formed in the guide barrel 65 and then inserted through the right third opening sections 6143 formed in the accommodation section 614 of the first lens frame 61, as shown in FIG. 10. The front end of each of the probes is then caused to come into contact with the exposed surface of the right second lens cutoff section L112 of the first lens L11.

The following state of the first lens L11 is thus achieved: The left second lens cutoff section L112 is elastically pressed by the two second probes each including a compression spring and the right second lens cutoff section L112 is pressed by the two second probes each including no compression spring. As a result, the first lens L11 can be held between the two sets of second probes facing each other (right and left second probes).

Adjustment of First Lens L11 by Using Adjustment Tool

Placing the tool for the positional adjustment as described above allows the upper and lower cutoff sections (first lens cutoff section L111 and third lens cutoff section L113) of the first lens L11 to be held by the upper pressing member 73 and the first probes. Further, the right and left cutoff sections (right and left second lens cutoff sections L112) of the first lens L11 are held by the second probes.

The adjustment of the position of the first lens L11, in detail, the adjustment of the position of the first lens L11 in the upward/downward direction is performed by changing the amount of movement of the first probes, and the adjustment of the position of the first lens L11 in the rightward/leftward direction is performed by changing the amount of movement of the right second probes, each of which includes no compression spring. The positional adjustment is performed while a projected image is visually recognized until the first lens L11 is moved to a position where field curvature and other aberrations are removed.

Fixation of First Lens L11 to First Lens Frame 61 (Accommodation Section 614)

After the positional adjustment is completed, the first lens L11 having undergone the adjustment is fixed to the first lens frame 61 (accommodation section 614). The fixation is performed by using a UV-curable adhesive in the present embodiment.

The surface of the third lens cutoff section L113 (protruding surface L114), which is the lower side of the first lens L11, is first fixed, although the order of the fixation is arbitrary, to the accommodation section 614 in the present embodiment. In detail, a front end portion of a dispenser filled with an adhesive is inserted, from the outside of the projection optical apparatus 5, into the second fixing opening section 516, which is formed on the lower side of the projection optical apparatus enclosure 51 (enclosure body 51A) and the opening section 655, which is formed on the lower side of the guide barrel 65. The adhesive is then injected through the first fixing opening section 6145 of the accommodation section 614, which faces the third lens cutoff section L113, onto the exposed surface of the third lens cutoff section L113 (protruding surface L114).

Corner portions of the first lens L11 where the first lens cutoff section L111 is connected to the second lens cutoff sections L112 are then fixed to the accommodation section 614. In this process, in a state in which the projection optical unit 50 is placed in the projection optical apparatus enclosure 51 (enclosure body 51A) on which the cover 51B is not placed, the upper side of the accommodation section 614 of the first lens frame 61 is open (exposed). The two first fixing opening sections 6145 located at the upper corner portions of the accommodation section 614 are therefore also open. In this state, the front end portion of the dispenser is directly inserted into the two first fixing opening sections 6145 located at the upper corner portions of the accommodation section 614, and the adhesive is injected onto the exposed side surface of the first lens L11.

The adhesive injected as described above fills the gap between the side surface of the first lens L11 and the inner surface of the accommodation section 614. The injected adhesive is then irradiated with ultraviolet light, and the adhesive thus cures. The side surface of the first lens L11 is thus fixed to the inner surface of the accommodation section 614 of the first lens frame 61 with the adhesive, whereby the first lens L11 is fixed to the first lens frame 61.

After the positional adjustment and fixation of the first lens L11 are completed, the cover 51B in which the light transmissive plate 53 is installed is placed from above on the enclosure body 51A. The assembly of the projection optical apparatus 5 is thus completed. Further, the second opening sections 514, the second fixing opening section 516, and the fourth opening sections 515 in the enclosure body 51A are blocked with tapes attached on the enclosure body 51A.

According to the embodiment described above, the following advantageous effects are provided.

According to the projection optical apparatus 5 of the present embodiment, the first lens group L1, which is the forefront lens group that is part of the first optical system 6 and outputs light to the reflection mirror 71, includes a lens (first lens L11) that allows final positional adjustment not only for the first lens group L1 but also for the other lens groups. The first lens L11 has the first lens cutoff section L111, which is a region so formed that part of the first lens L11 is cut off, and the first lens frame 61 has the inclined section 613, and the first lens cutoff section L111 and the inclined section 613 are provided in a predetermined position or a position where interference with the projection light reflected off the reflection mirror 71 is avoided. The first lens cutoff section L111 is elastically pressed by the upper pressing member 73 in a direction roughly perpendicular to the optical axis C. Since the accommodation section 614 has the first opening sections 6142, which expose the surface of the third lens cutoff section L113, which faces the first lens cutoff section L111, the first probes for the positional adjustment are allowed to be inserted into the opening sections 653 in the guide barrel 65 and the second opening sections 514 in the projection optical apparatus enclosure 51 and come into contact with the surface of the third lens cutoff section L113 through the first opening sections 6142. The first lens L11 can therefore be held between the first probes and the upper pressing member 73, which faces the first probes, whereby the first lens L11 can be moved (position thereof can be adjusted) by moving the first probes. The configuration described above eliminates a need to insert a probe toward the first lens cutoff section L111 (from the side where the optical path of the reflected light is present) and prevents the adjustment tool from blocking the reflected light.

Therefore, when the projection optical apparatus 5 uses the second optical system 7 including the reflection mirror 71, the position of the first lens L11 can be adjusted without blockage of the reflected light. Further, since the positional adjustment can be performed by use of no master projection optical apparatus but by use of the projection optical apparatus 5, which is a product, while a projected image is visually recognized, whereby suppressed amounts of aberrations achieved at the time of the adjustment can be directly and reliably maintained.

According to the projection optical apparatus 5 of the present embodiment, the third opening sections 6143 of the accommodation section 614 are so formed to expose the side surface of the first lens L11 (surfaces of second lens cutoff sections L112) in positions facing each other. Therefore, when the position of the first lens L11 is adjusted, the first lens L11 can be held in a well-balanced manner by the second probes inserted into the third opening sections 6143 as well as the first probes inserted into the first opening sections 6142, whereby the first lens L11 can be stably moved (adjusted). Further, providing the guide barrel 65 with the fourth opening sections 654 and the projection optical apparatus enclosure 51 with the fourth opening sections 515 in such a way that the fourth opening sections 654 and 515 face the third opening sections 6143 allows the second probes to be inserted from the outside of the projection optical apparatus 5.

According to the projection optical apparatus 5 of the present embodiment, the variety of opening section at the specific locations (first opening sections 6142, second opening sections 514, opening sections 653, right and left third opening sections 6143, and right and left fourth opening sections 515 and 654) are each formed of two holes. Two probes are therefore allowed to be inserted in correspondence with the two holes and come into contact with the side surface of the first lens L11, whereby the first lens L11 can be held more stably than in a case where one probe is allowed to come into contact with the first lens L11. The configuration described above can provide its advantageous effect particularly when the position of a large or heavy lens which is adjusted.

According to the projection optical apparatus 5 of the present embodiment, the accommodation section 614 has the first fixing opening section 6145, and the guide barrel 65 and the projection optical apparatus enclosure 51 have the opening section 655 and second fixing opening section 516, respectively, which face the first fixing opening section 6145. The configuration described above allows a dispenser filled with an adhesive to be inserted into the opening section 655 and the second fixing opening section 516 and the adhesive to be injected onto the exposed side surface of the first lens L11 through the first fixing opening section 6145. As a result, the adhesive is injected, from the outside of the projection optical apparatus 5 having undergone the positional adjustment, into the gap between the side surface of the first lens L11 and the accommodation section 614, whereby the first lens L11 can be reliably fixed to the accommodation section 614.

According to the projection optical apparatus 5 of the present embodiment, in which the first optical system 6 and the second optical system 7 are provided as a projection system, and the first lens group L1 to the third lens group L3 are configured as lens groups for focus adjustment, variation in aberrations due to the focus adjustment can be suppressed to a small value when short-distance projection is performed.

According to the projector 1 of the present embodiment, since it includes the projection optical apparatus 5, which allows suppressed amounts of aberrations achieved at the time of the adjustment to be maintained, variation in aberrations can be efficiently suppressed, whereby the quality of a projected image can be improved.

The invention is not limited to the embodiment described above, and a variety of changes, improvements, and other modifications can be made thereto to the extent that they do not depart from the substance of the invention. Variations follow.

The projection optical apparatus 5 according to the embodiment described above includes a pressing section (upper pressing member 73), but a configuration in which no pressing section is provided may be employed.

Figure 11:
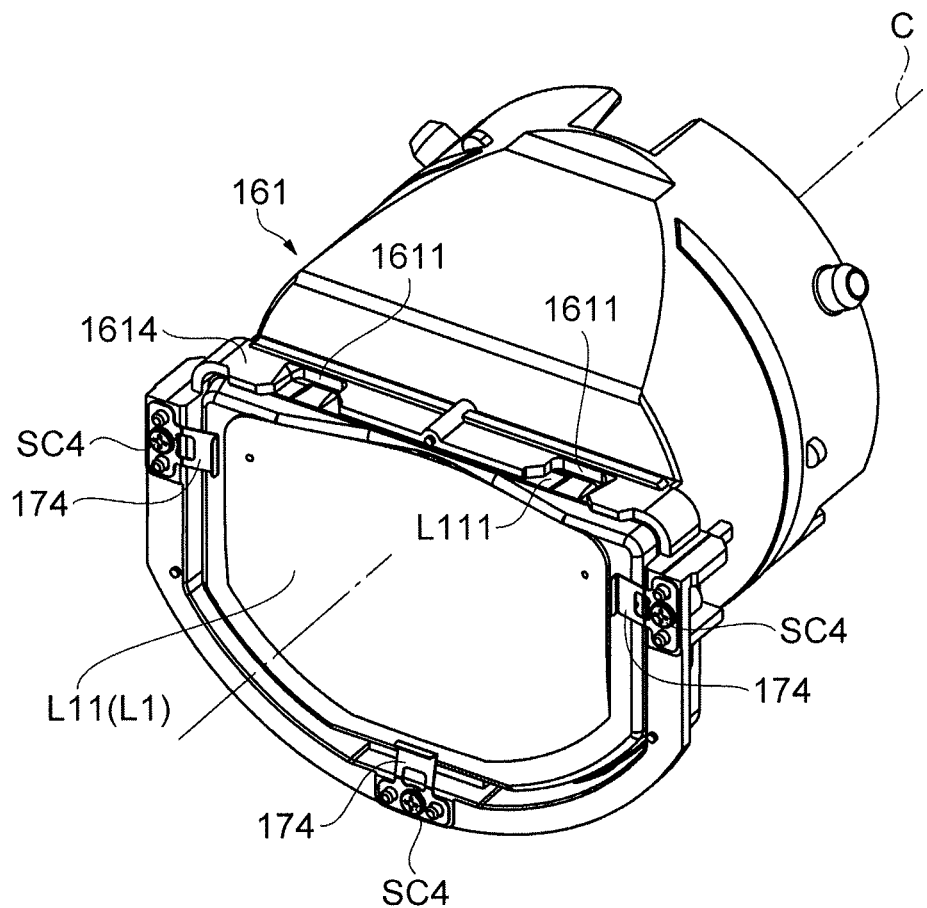
FIG. 11 is a perspective view showing a first lens, a first lens frame, and a front pressing member in a projection optical apparatus according to a variation.

FIG. 11 is a perspective view showing the first lens L11, a first lens frame 161, and a front pressing member 174 in a projection optical apparatus including no pressing section.

The first lens frame 161 in the present variation has cutouts 1611 as an open section that exposes the first lens cutoff section L111 of the first lens L11, as shown in FIG. 11. Although not shown, the projection optical apparatus according to the variation includes a guide barrel and a projection optical apparatus enclosure similar to the guide barrel 65 and the projection optical apparatus enclosure 51 in the embodiment described above, and the first lens frame 161 has first opening sections and third opening sections similar to the first opening sections 6142 and the third opening sections 6143 of the first lens frame 61 in the embodiment described above. The position of the first lens L11 in the upward/downward direction is adjusted by using probes inserted into the cutouts 1611 and the first opening sections. Each of the probes inserted into the cutouts 1611 has a front end bent in an L-like shape that does not block the projection light reflected off the reflection mirror 71. The adjustment of the first lens L11 in the rightward/leftward direction is performed in the same manner as in the embodiment described above.

The front pressing member 74 in the embodiment described above has the three spring sections 742, which are integrated with the front pressing member 74. Instead, an aspect in which three front pressing members 174, which are separate members and have the same shape, as shown in FIG. 11, may be employed.

In the projection optical apparatus 5 according to the embodiment described above, the guide barrel 65 has the opening sections 653, which expose the first opening sections 6142 of the accommodation section 614. Instead, a configuration in which the accommodation section 614 protrudes from the guide barrel 65 so that the first opening sections 6142 are exposed may be employed.

In the projection optical apparatus 5 according to the embodiment described above, the guide barrel 65 has the fourth opening sections 654, which expose the third opening sections 6143 of the accommodation section 614. Instead, a configuration in which the accommodation section 614 protrudes from the guide barrel 65 so that the third opening sections 6143 are exposed may be employed.

Further, the enclosure body 51A has the fourth opening sections 515, which expose the third opening sections 6143 of the accommodation section 614. Instead, a configuration in which the standing wall of the enclosure body 51A is lowered downward (set apart from the optical axis C in the upward/downward direction) so that the third opening sections 6143 are exposed may be employed.

In the projection optical apparatus 5 according to the embodiment described above, the accommodation section 614 has the third opening sections 6143. Instead, an accommodation section having no third opening section 6143 may be employed.

In the projection optical apparatus 5 according to the embodiment described above, the variety of opening section at the specific locations (first opening sections 6142, second opening sections 514, opening sections 653, right and left third opening sections 6143, and right and left fourth opening sections 515 and 654) are each formed of two holes. However, the two holes are not necessarily provided, and a configuration in which two cutouts are provided or a configuration in which one hole and one cutout are provided may be employed.

In the projection optical apparatus 5 according to the embodiment described above, the variety of opening section at the specific locations (first opening sections 6142, second opening sections 514, opening sections 653, right and left third opening sections 6143, and right and left fourth opening sections 515 and 654) are each formed of two holes. However, the two holes are not necessarily provided, and a configuration in which one hole is provided may be employed. In this case, the one hole is not necessarily provided, and a configuration in which one cutout is provided may be employed.

In the projection optical apparatus 5 according to the embodiment described above, the opening section 655 is formed in the guide barrel 65 and the second fixing opening section 516 is formed in the projection optical apparatus enclosure 51 (enclosure body 51A) so as to face the first fixing opening section 6145 of the accommodation section 614. However, the second fixing opening section 516 cannot be formed in the guide barrel 65 or the projection optical apparatus enclosure 51 in some cases due, for example, to the shapes thereof. In such cases, the second fixing opening section may be formed in a member located in a position facing the first fixing opening section 6145 (guide barrel 65 or projection optical apparatus enclosure 51).

The projector 1 according to the embodiment described above is so installed on the wall surface W via the support apparatus SD that the bottom surface 1A faces upward and projects an image on the screen SC, which is installed below the projector 1, as shown in FIG. 1. The installation of the projector 1 is, however, not limited to a specific manner, and the projector 1 may be installed on a ceiling surface, a floor surface, a desktop, or any other surface and allowed to project an image on the screen SC installed on the wall surface W. Still instead, the projector 1 may be installed on a desktop and allowed to project an image on the same desktop.

In the projector 1 according to the embodiment described above, the electro-optical apparatus 35 employs what is called a three-panel method using three light modulators corresponding to R light, G light, and B light. The electro-optical apparatus 35 is not necessarily configured this way and may employ a single-panel light modulator. Further, an additional light modulator for improving contrast may be employed.

In the projector 1 according to the embodiment described above, the electro-optical apparatus 35 employs transmissive light modulators (transmissive liquid crystal panels 351). The electro-optical apparatus 35 is not necessarily configured this way and may employ reflective light modulators.

In the projector 1 according to the embodiment described above, the electro-optical apparatus 35 employs the liquid crystal panels 351 as the light modulators. The electro-optical apparatus 35 is not necessarily configured this way and may, in general, employ any component that modulates an incident light flux on the basis of an image signal, for example, a micromirror-type light modulator or any other type of light modulator. A DMD (digital micromirror device) can, for example, be employed as the micromirror-type light modulator.

In the projector 1 according to the embodiment described above, the optical unit 3 employs a lens integrator system formed of the lens arrays 321 and 322 as the illumination optical apparatus 32, which homogenizes the illuminance of the light flux outputted from the light source apparatus 31. The optical unit 3 is not necessarily configured this way and can employ a rod integrator system formed of a light guide rod.

In the optical unit 3 in the projector 1 according to the embodiment described above, the light source lamp 311 in the light source apparatus 31 employs an ultrahigh-pressure mercury lamp or any other discharge lamp but may instead employ a laser diode, an LED (light emitting diode), an organic EL (electro luminescence) device, a silicon-based light emitting device, or any of a variety of other solid-state light emitting devices.

The entire disclosure of Japanese Patent Application No. 2015-013029, filed Jan. 27, 2015 and Japanese Patent Application No. 2015-218093, filed Nov. 6, 2015 are expressly incorporated by reference herein.

What is claimed is:
1. A projection optical apparatus comprising:
a first optical system including a plurality of lens groups arranged along an optical axis;
a second optical system including a reflection mirror and reflects light having exited out of the first optical system; and
a projection optical apparatus enclosure that accommodates the first optical system and the second optical system,
wherein the first optical system includes
a first lens, among the plurality of lens groups, located in a position closest to the second optical system,
a first lens frame having an accommodation section that accommodates the first lens, and
a guide barrel that accommodates the first lens frame,
the first lens has a lens cutoff section that is a region where part of the first lens is cut off and that is located on the side where the light reflected off the reflection mirror passes,
the accommodation section has a wall section that is located outside the lens cutoff section and a first opening section that exposes a first side surface that is a side surface of the first lens and is opposite the lens cutoff section,
the wall section is provided with an open section that exposes the lens cutoff section,
the guide barrel is so formed as to expose the first opening section and the open section, and
the projection optical apparatus enclosure has a second opening section that exposes the first opening section and is configured to be capable of exposing the open section.

2. The projection optical apparatus according to claim 1, further comprising
a pressing section that has elasticity and presses the lens cutoff section exposed through the open section toward the first opening section.

3. The projection optical apparatus according to claim 1,
wherein the first lens has a pair of second side surfaces located along a second direction that intersects a first direction oriented from the lens cutoff section toward the first side surface,
the accommodation section has a pair of third opening sections that expose the pair of second side surfaces,
the guide barrel is so formed as to expose the pair of third opening sections, and
the projection optical apparatus enclosure is so configured as to be capable of exposing the pair of third opening sections.

4. The projection optical apparatus according to claim 3, wherein each of the first opening section, the second opening section, and the pair of third opening sections is formed of two holes, two cutouts, or one hole and one cutout.

5. The projection optical apparatus according to claim 1, wherein the accommodation section has a first fixing opening section that exposes a side surface of the first lens for fixation of the first lens, the guide barrel is so formed as to expose the first fixing opening section, and the projection optical apparatus enclosure has a second fixing opening section that exposes the first fixing opening section.

6. The projection optical apparatus according to claim 1, wherein the plurality of lens groups include a lens group for focus adjustment.

7. A projector comprising:
a light source apparatus that outputs light;
a light modulator that modulates the light in accordance with image information; and
the projection optical apparatus according to claim 1 that projects the light modulated by the light modulator.

8. A projector comprising:
a light source apparatus that outputs light;
a light modulator that modulates the light in accordance with image information; and
the projection optical apparatus according to claim 2 that projects the light modulated by the light modulator.

9. A projector comprising:
a light source apparatus that outputs light;
a light modulator that modulates the light in accordance with image information; and
the projection optical apparatus according to claim 3 that projects the light modulated by the light modulator.

10. A projector comprising:
a light source apparatus that outputs light;
a light modulator that modulates the light in accordance with image information; and
the projection optical apparatus according to claim 4 that projects the light modulated by the light modulator.

11. A projector comprising:
a light source apparatus that outputs light;
a light modulator that modulates the light in accordance with image information; and
the projection optical apparatus according to claim 5 that projects the light modulated by the light modulator.

12. A projector comprising:
a light source apparatus that outputs light;
a light modulator that modulates the light in accordance with image information; and
the projection optical apparatus according to claim 6 that projects the light modulated by the light modulator.

* * * * *